United States Patent [19]
Naneda

[11] Patent Number: 5,712,474
[45] Date of Patent: Jan. 27, 1998

[54] IMAGE PROCESSING APPARATUS FOR CORRECTING BLURRING OF AN IMAGE PHOTOGRAPHED BY A VIDEO CAMERA

[75] Inventor: Kitahiro Naneda, Yokohama, Japan

[73] Assignee: Canon Kabushiki Kaisha, Tokyo, Japan

[21] Appl. No.: 781,527

[22] Filed: Jan. 9, 1997

Related U.S. Application Data

[63] Continuation of Ser. No. 314,009, Sep. 28, 1994, abandoned.

[30] Foreign Application Priority Data

| Sep. 29, 1993 | [JP] | Japan | 5-265795 |
| Sep. 29, 1993 | [JP] | Japan | 5-265796 |
| Sep. 29, 1993 | [JP] | Japan | 5-265797 |
| Sep. 29, 1993 | [JP] | Japan | 5-265799 |

[51] Int. Cl.⁶ ............ H04N 5/30; H04N 5/228; H04N 7/18
[52] U.S. Cl. .................... 250/208.1; 348/208
[58] Field of Search ............ 250/208.1, 214 P; 348/208, 154, 699; 382/236

[56] References Cited

U.S. PATENT DOCUMENTS

| 4,965,442 | 10/1990 | Girod et al. | 250/201.7 |
| 5,289,274 | 2/1994 | Kondo | 348/208 |
| 5,291,300 | 3/1994 | Ueda | 358/335 |
| 5,371,539 | 12/1994 | Okino et al. | 348/207 |
| 5,450,126 | 9/1995 | Nishida | 348/208 |

*Primary Examiner*—Stephone Allen
*Attorney, Agent, or Firm*—Morgan & Finnegan, L.L.P

[57] ABSTRACT

This invention has as its object to provide an image processing apparatus which appropriately corrects an image blur, and can prevent an image disturbed by the correction contrary to its original purpose from being photographed or recorded. In order to achieve this object, an image processing apparatus for detecting motion vectors from an image signal and correcting an image blur in real time, includes: detection apparatus for detecting motion vectors between images by executing a correlation calculation between time-serially continuous images; calculation apparatus for calculating the absolute deviation of an image from a reference point by adding the motion vectors detected by the detection apparatus; comparison apparatus for comparing the absolute deviation with a predetermined correction amount; and interruption apparatus for, when a state wherein the absolute deviation is larger than the predetermined correction amount continues for a predetermined period of time or longer, determining that the image blur has exceeded a correctable range, and interrupting correction of the image blur.

44 Claims, 31 Drawing Sheets

IMAGE PROCESSING APPARATUS FOR CORRECTING BLURRING OF AN IMAGE PHOTOGRAPHED BY A VIDEO CAMERA

This is a continuation of application Ser. No. 08/314,009, filed on Sep. 28, 1994, now abandoned.

BACKGROUND OF THE INVENTION

The present invention relates to an image processing apparatus and, more particularly, to an image processing apparatus for correcting blurring of an image photographed by a video camera.

In recent years, the weight and size of a camera built-in type VTR (video tape recorder) as a whole have been greatly reduced due to use of a rear-focus type lens, reduction in size and high-density packaging of components used, and the like, and the magnification of a lens itself tends to increase. Such a VTR is often used in a large-magnification photographing operation in a hand-held state without using any tripod. For this reason, a slight camera shake in use appears as an image blur in a photographed image, thus requiring an image blur prevention mechanism.

As an image blur prevention apparatus in this case, an inertial pendulum type image blur prevention apparatus is disclosed in U.S. Pat. Nos. 2,959,088 and 2,829,557. In this inertial pendulum type image blur prevention apparatus, a correction optical system is movably held by a gimbal mechanism, and an image blur caused by a camera shake is prevented by the inertia.

There is also proposed a variable apical angle type image blur prevention apparatus, in which a variable apical angle prism is arranged in front of a front-lens element of lenses in a video camera, and when a vibration is detected by a sensor, an image blur is prevented by controlling the apical angle of the prism.

Furthermore, a pure electronic type image blur prevention apparatus is proposed by Japanese Patent Laid-Open No. 61-248681. In this apparatus, a video signal from an image pickup element is stored in an image memory, an image deviation is detected based on the stored information, and the read address of the image memory is shifted based on the detected deviation amount, thereby correcting an image blur. The pure electronic type image blur prevention apparatus does not require any mechanical mechanism in correction of an image blur, can have a compact, lightweight arrangement, and can reduce manufacturing cost. For this reason, this apparatus has been receiving a lot of attention recently.

However, in this pure electronic type image blur prevention apparatus, since an image blur detection region corresponding to the setting condition of an optical system is narrower than that of the above-mentioned sensor detection method, an image blur often exceeds the detection region, and in such a case, correction cannot be performed. Also, a correction limit region of the apparatus corresponding to the setting condition of the optical system is determined by an image pickup element and a memory constituting the apparatus. For this reason, when the blur correction amount has exceeded the correction limit region, correction can no longer be performed and an image is disturbed if correction is continued. Furthermore, due to the characteristics or quick motion of an object in a frame, motion vectors are often difficult to detect. In such a case, the accuracy of a blur correction value is considerably lowered under the setting condition of the optical system.

SUMMARY OF THE INVENTION

The present invention has been made in consideration of the above situation, and has as its principal object to provide an image processing apparatus which can properly correct an image blur, and can prevent an image disturbed by correction from being photographed or recorded.

It is another object of the present invention to provide an image processing apparatus which can correct an image blur even when an image blur has exceeded a detection range or a correction limit region.

It is still another object of the present invention to provide an image processing apparatus which can correct an image blur even when motion vectors are difficult to detect due to the characteristics or motion of an object.

In order to achieve the above objects, according to the first aspect of the present invention, an image processing apparatus is characterized by comprising the following arrangement.

That is, there is provided an image processing apparatus for detecting motion vectors from an image signal and correcting an image blur in real time, comprising: detection means for detecting motion vectors between images by executing a correlation calculation between time-serially continuous images; calculation means for calculating an absolute deviation of an image from a reference point by adding the motion vectors detected by the detection means; comparison means for comparing the absolute deviation with a predetermined correction amount; and interruption means for, when a state wherein the absolute deviation is larger than the predetermined correction amount continues for a predetermined period of time or longer, determining that the image blur has exceeded a correctable range, and interrupting correction of the image blur.

According to the second aspect of the present invention, an image processing apparatus is characterized by comprising the following arrangement.

That is, there is provided an image processing apparatus for detecting motion vectors from an image signal and correcting an image blur in real time, comprising: detection means for detecting motion vectors between images by executing a correlation calculation between time-serially continuous images; calculation means for calculating an absolute deviation of an image from a reference point by adding the motion vectors detected by the detection means; comparison means for comparing the absolute deviation with a predetermined correction amount; and warning means for, when a state wherein the absolute deviation is larger than the predetermined correction amount continues for a predetermined period of time or longer, determining that the image blur has exceeded a correctable range, and generating a warning to a photographer.

According to the third aspect of the present invention, an image processing apparatus is characterized by comprising the following arrangement.

That is, there is provided an image processing apparatus for detecting motion vectors from an image signal and correcting an image blur in real time, comprising: motion vector detection means for detecting motion vectors between images by executing a correlation calculation between time-serially continuous images; disturbance detection means for detecting a disturbance of the motion vectors detected by the motion vector detection means; and interruption means for, when the disturbance of the motion vectors is larger than a predetermined amount, determining that the motion vectors cannot be accurately detected, and interrupting correction of the image blur.

According to the fourth aspect of the present invention, an image processing apparatus is characterized by comprising the following arrangement.

That is, there is provided an image processing apparatus for detecting motion vectors from an image signal and correcting an image blur in real time, comprising: motion vector detection means for detecting motion vectors between images by executing a correlation calculation between time-serially continuous images; disturbance detection means for detecting a disturbance of the motion vectors detected by the motion vector detection means; and warning means for, when the disturbance of the motion vectors is larger than a predetermined amount, determining that the motion vectors cannot be accurately detected, and generating a warning to a photographer.

According to the fifth aspect of the present invention, an image processing apparatus is characterized by comprising the following arrangement.

That is, there is provided an image processing apparatus for detecting motion vectors between images from an image signal obtained by converting an optical signal from an object, which signal is obtained via an optical system including a focusing lens group and a zoom lens group, into an electrical signal, and correcting a blur of the image in real time, comprising: vector detection means for detecting motion vectors between images by executing a correlation calculation between time-serially continuous images; blur detection means for detecting a blur state of the image on the basis of motion information such as absolute values, spatial distribution, time distribution, and the like of a plurality of motion vectors detected by the vector detection means; blur correction range control means for, when the blur detection means detects that the image is blurred beyond a predetermined value, optically changing a blur correction range by controlling a focal length of the optical system; and field angle control means for controlling a field angle of an image displayed on a viewfinder in synchronism with the control of the blur correction range control means.

According to the sixth aspect of the present invention, an image processing apparatus is characterized by comprising the following arrangement.

That is, there is provided an image processing apparatus for detecting motion vectors between images from an image signal obtained by converting an optical signal from an object, which signal is obtained via an optical system including a focusing lens group and a zoom lens group, into an electrical signal, and correcting a blur of the image in real time, comprising: vector detection means for detecting motion vectors between images by executing a correlation calculation between time-serially continuous images; calculation means for calculating an absolute deviation of an image from a reference point by adding the motion vectors detected by the vector detection means; blur correction range control means for, when the number of times of continuous excess of the absolute deviation calculated by the calculation means over a predetermined reference correction amount has exceeded a predetermined reference count, optically changing a blur correction range by controlling a focal length of the optical system; and field angle control means for controlling a field angle of an image displayed on a viewfinder in synchronism with the control of the blur correction range control means.

According to the seventh aspect of the present invention, an image processing apparatus is characterized by comprising the following arrangement.

That is, there is provided an image processing apparatus for detecting motion vectors between images from an image signal obtained by converting an optical signal from an object, which signal is obtained via an optical system including a focusing lens group and a zoom lens group, into an electrical signal, and correcting a blur of the image in real time, comprising: vector detection means for detecting motion vectors between images by executing a correlation calculation between time-serially continuous images; disturbance detection means for detecting a disturbance of the motion vectors detected by the motion vector detection means; blur correction range control means for, when the disturbance of motion vectors detected by the disturbance detection means has exceeded a predetermined reference amount, optically changing a blur correction range by controlling a focal length of the optical system; and field angle control means for controlling a field angle of an image displayed on a viewfinder in synchronism with the control of the blur correction range control means.

According to the eighth aspect of the present invention, an image processing apparatus is characterized by comprising the following arrangement.

That is, there is provided an image processing apparatus for detecting motion vectors from an image signal and correcting an image blur in real time, comprising: vector detection means for detecting motion vectors between images by executing a correlation calculation between time-serially continuous images; blur detection means for detecting a blur state of the image on the basis of motion information such as absolute values, spatial distribution, time distribution, and the like of a plurality of motion vectors detected by the vector detection means; and interruption means for, when the blur amount of the image detected by the blur detection means has exceeded a predetermined value, interrupting correction of the blur.

According to the ninth aspect of the present invention, an image processing apparatus is characterized by comprising the following arrangement.

That is, there is provided an image processing apparatus for detecting motion vectors from an image signal and correcting an image blur in real time, comprising: vector detection means for detecting motion vectors between images by executing a correlation calculation between time-serially continuous images; blur detection means for detecting a blur state of the image on the basis of motion information such as absolute values, spatial distribution, time distribution, and the like of a plurality of motion vectors detected by the vector detection means; and warning means for, when the blur amount of the image detected by the blur detection means has exceeded a predetermined value, generating a warning.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The preferred embodiments of the present invention will be described hereinafter with reference to the accompanying drawings.

(First Embodiment)

Figure 1:
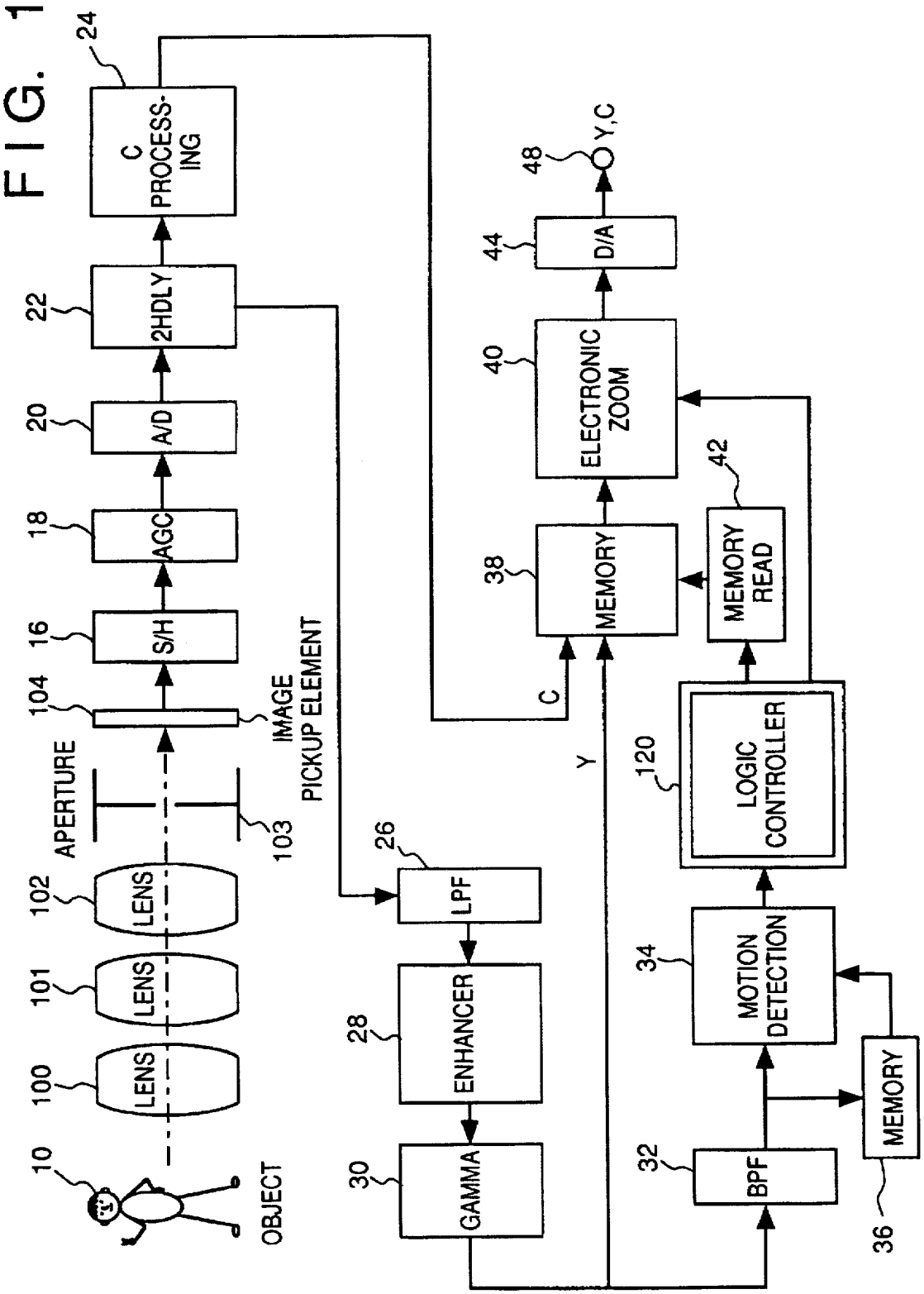
FIG. 1 is a block diagram showing the arrangement of main part of a camera built-in type VTR according to the first embodiment of the present invention.

FIG. 1 is a block diagram showing the arrangement of main part of a camera built-in type VTR (video tape recorder) which includes an image processing apparatus according to the first embodiment of the present invention.

Referring to FIG. 1, reference numeral 100 denotes a focusing lens group for normal focusing; 101, a zoom lens group for changing a focal length; 102, a lens group of a correction system for correcting the defocus amount of the focal plane which is changed by the operation of the zoom lens group; 103, an aperture; 104, an image pickup element comprising, e.g., a two-dimensional CCD; 16, a sample & hold (S/H) circuit for sampling an electrical signal obtained from the image pickup element; 18, an automatic gain control (AGC) circuit for holding the signal level substantially constant; 20, an analog-to-digital (A/D) converter; 22, a circuit for delaying a color-difference line-sequential signal from the image pickup element by one or two horizontal scanning periods (the horizontal scanning period will be represented by "H" hereinafter) and outputting a 1H delay signal and a sum of 0H and 2H delay signals; 24, a circuit for generating a chrominance signal C; 26, a low-pass filter (LPF) for removing a chrominance signal mixed in a luminance signal Y; 28, an enhancer for enhancing a high-frequency component; 30, a gamma correction circuit; 32, a two-dimensional band-pass filter (BPF); 34, a motion vector detection circuit for detecting motion vectors from an image signal; 36 and 38, field memories; 120, a logic controller for executing various kinds of signal processing; 42, a memory read control circuit; 40, an electronic zoom circuit for electronically enlarging/reducing an image read out from the memory; 44, a digital-to-analog (D/A) converter; and 48, a signal output terminal for the chrominance signal C and the luminance signal Y.

The operation of the apparatus shown in FIG. 1 will be described below. An image of an object 10 is formed on the image pickup element 104 via the lens groups 100, 101, and 102, and the aperture 103, and is photoelectrically converted. The S/H circuit 16 holds an output signal from the image pickup element 104, and the next AGC circuit 18 executes automatic gain control to obtain a substantially constant output signal level. The A/D converter 20 A/D-converts the output signal form the AGC circuit 18. The 2-H delay circuit 22 separates a color-difference line-sequential signal, which has been converted into a digital signal, into a 1H delay signal and a (0H+2H) delay signal, and respectively supplies these signals to a luminance signal processing unit (the LPF 26 and the subsequent circuits) and a chrominance signal processing unit (the circuit 24 and the subsequent circuits). The chrominance signal processing circuit 24 generates a chrominance signal, and writes it in the field memory 38.

On the other hand, the signal supplied to the luminance signal processing unit (the LPF 26 and the subsequent circuits) is input to the LPF 26 first. The LPF 26 removes a carrier component from the color-difference line-sequential signal, thus separating a luminance signal. The enhancer 28 executes processing for enhancing high-frequency components such as the edges of an object for the purpose of improving image quality. Normally, the enhancer 28 adds a secondary differential signal of a video signal to an original signal. The gamma correction circuit 30 performs gamma correction for preventing saturation at a highlight portion and for widening the dynamic range. The BPF 32 extracts spatial frequency components effective for detecting motion vectors. In general, high- and low-frequency components of an image signal are removed by the BPF 32 in advance since they are not suitable for detection of motion vectors. In this embodiment, only the sign bit of the output from the BPF 32 is output. This means that the luminance signal is binarized using the DC level as a threshold level. Therefore, the luminance signal after the BPF 32 is a 1-bit binary signal. The motion vector detection circuit 34 is a circuit for detecting motion vectors by matching calculations. In this embodiment, the circuit 34 must adopt a detection method which allows real-time processing. The memory 36 is a delay circuit for delaying the luminance signal output from the BPF 32 by a predetermined period of time (a 1-field period in this embodiment). The memory 36 stores a luminance signal one field before, and compares the stored signal with the luminance signal of the current field, thus allowing matching calculations for detecting the direction and magnitude of an image displacement. The logic controller 120 calculates a deviation, from a reference position, of an image at that instance from the output signals (horizontal and vertical components of motion vectors) from the motion vector detection circuit 34 in accordance with the flow chart shown in FIG. 2. The memory read control circuit 42 controls the read-out position of the field memory 38 so that the deviation position calculated by the logic controller 120 becomes the center, i.e., the motion vectors are canceled. The data read out from the memory 38 is enlarged/reduced by the electronic zoom circuit 40 to a desired size by linear interpolation, and is converted into a normal frame. The image signal which is generated as described above is converted into an analog signal by the D/A converter as a signal from which an image blur is corrected, and the converted image signal is output from the signal output terminal 48.

Figure 2:
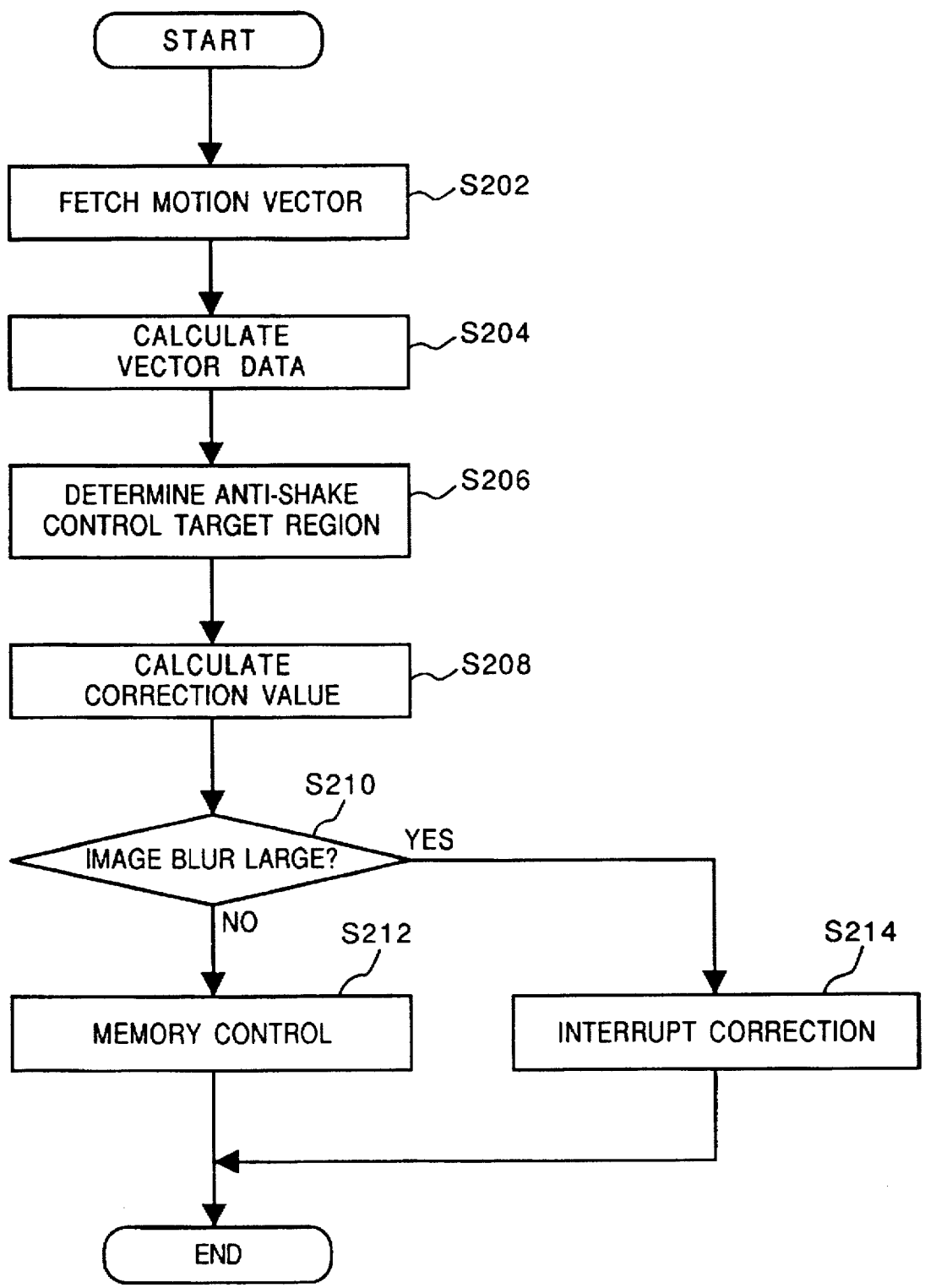
FIG. 2 is a flow chart showing the processing contents in a logic controller in FIG. 1.

FIG. 2 is a flow chart showing the processing contents of the logic controller 120 shown in FIG. 1. The operation of the logic controller 120 will be described in detail below with reference to FIG. 2.

Referring to FIG. 2, in step S202, the output signals (horizontal and vertical components of motion vectors at a predetermined frame position) from the motion vector detection circuit 34 are fetched in units of fields.

In step S204, motion vectors detected at the predetermined frame position, which are fetched in step S202, are integrated to calculate a deviation from the reference position of the frame, thereby obtaining an image blur correction signal. In this case, the reliability of individual motion vectors is evaluated together, and is reflected in the integral operation, thus obtaining a deviation more accurately.

In step S206, a frame portion including a movement is discriminated on the basis of the motion vectors and the spatial distribution or time variation of the motion vector integrated values calculated in steps S202 and S204, thus determining a correction target region.

In step S208, the motion vector integrated values in the correction target region determined in step S206 are extracted to calculate a final image blur correction value.

More specifically, in step S208, a portion including a movement in the frame is discriminated on the basis of the motion vectors and the spatial distribution or time variation of the motion vector integrated values calculated in steps S202 and S204, thus determining a correction target region.

In step S210, it is checked based on the image blur correction value calculated in step S208 if the current image blur has exceeded, e.g., a correctable region on the field memory 38. If YES in step S210, it is determined that image blur correction is disabled, and the correction is interrupted (step S214). On the other hand, if NO In step S210, the flow advances to step S212 to execute image blur correction. The routines in steps S210 and S214 constitute principal part of the present invention, and will be described in detail later.

In step S212, the image blur correction value calculated in step S210 is converted into a read address of the field memory, and a command for actually controlling the memory is issued. Furthermore, a command for supplying a desired enlargement or reduction magnification to the electronic zoom circuit 40 is issued.

The image blur discrimination routine in step S210 and the correction interruption routine in step S214 will be described below with reference to FIGS. 3 to 7.

Figure 3:
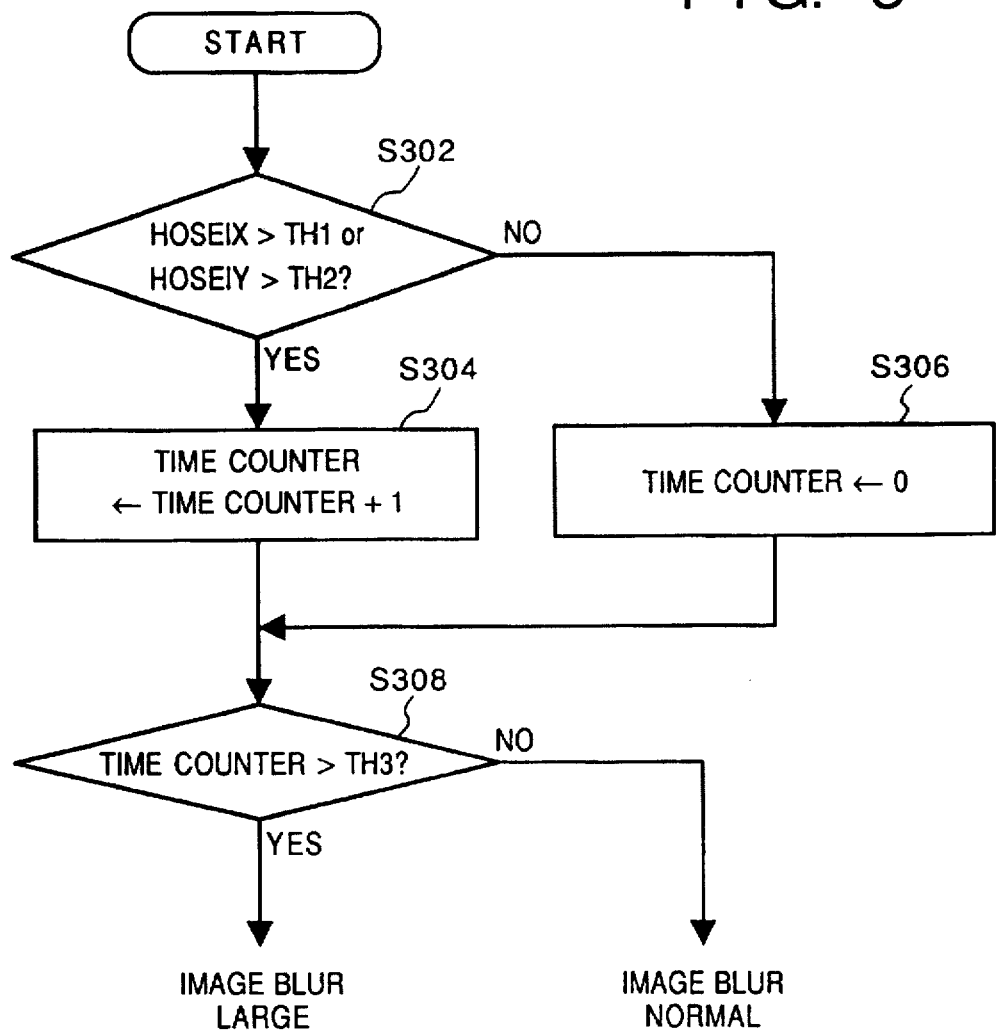
FIG. 3 is a flow chart showing in detail part of the processing shown in FIG. 2.

FIG. 3 is a flow chart showing in detail the image blur discrimination routine.

Figure 5:
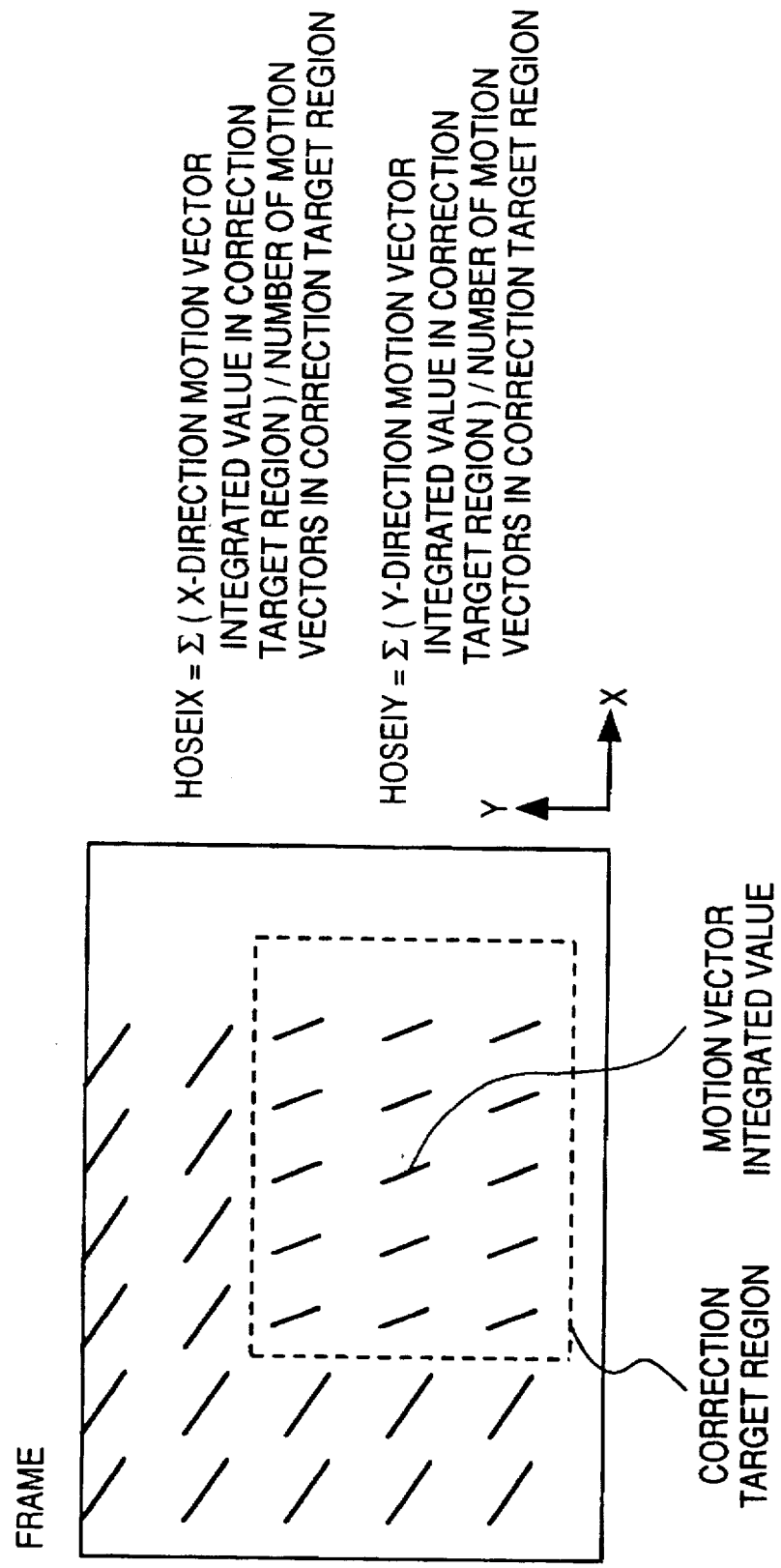
FIG. 5 is a view for explaining a method of calculating correction values (HOSEIX, HOSEIY)
Figure 6:
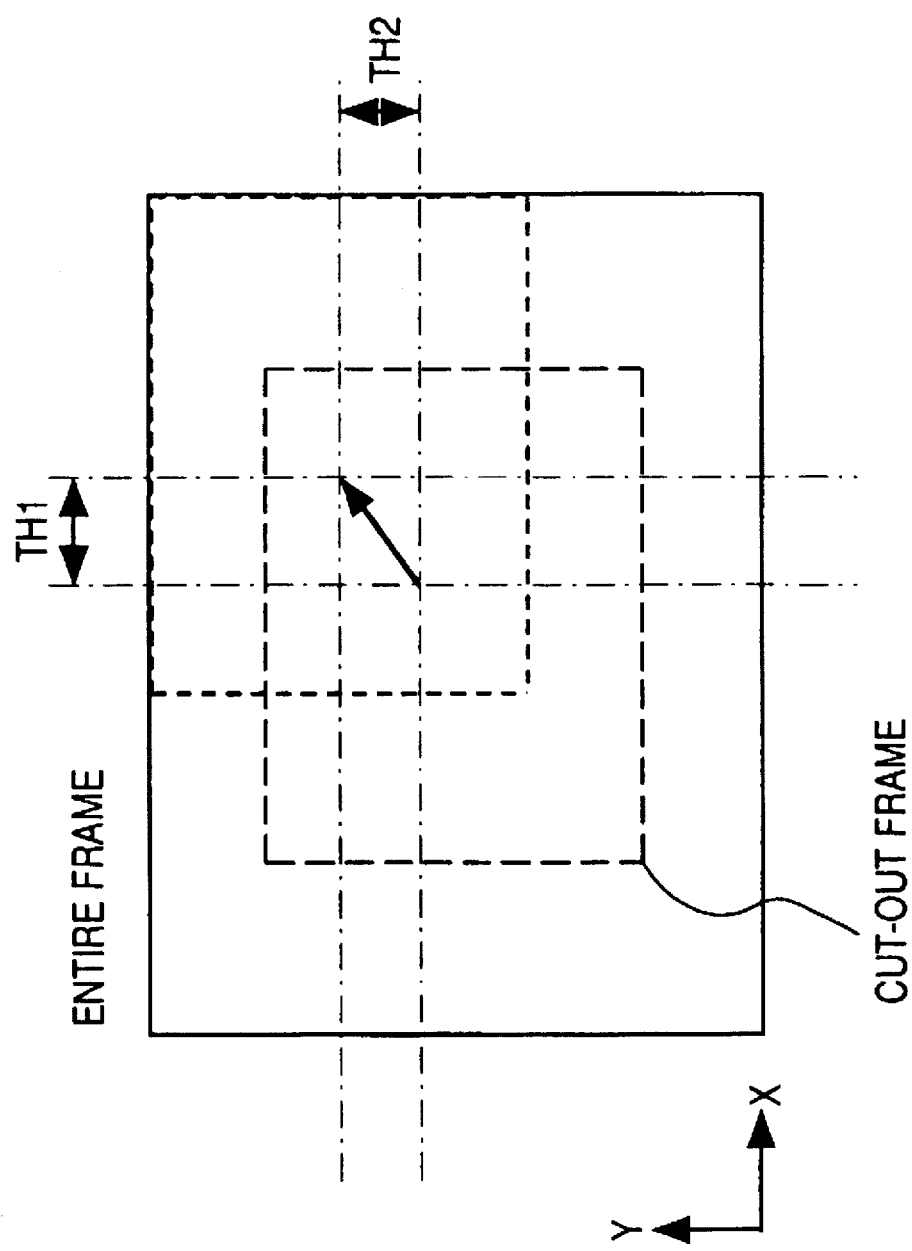
FIG. 6 is a view for explaining a correction limit region.

In step S302, it is checked if at least one of an X-direction blur correction value HOSEIX and a Y-direction blur correction value HOSEIY has exceeded a predetermined threshold value TH1 or TH2. The correction values HOSEIX and HOSEIY are obtained by averaging the motion vector integrated values in the correction target region determined in step S206 in FIG. 2, as shown in FIG. 5. The threshold values TH1 and TH2 are set to be values corresponding to offsets from the center in the X- and Y-directions upon cutting of an image at a predetermined reduction magnification from the field memory 38, as shown in FIG. 6, i.e., limit values capable of correcting an image blur.

If YES in step S302, the value of a time counter is incremented by 1 (step S304). The time counter counts how many times the blur correction value has continuously exceeded the predetermined threshold value. On the other hand, if NO in step S302, the time counter is reset (step S306).

In step S308, it is finally checked if image blur correction can be performed, i.e., if the count value of the time counter has exceeded a predetermined count TH3. More specifically, if YES in step S308, it is determined that the correction value has already largely exceeded the correction limit region (see FIG. 6), and correction can no longer be performed; otherwise, it is determined that correction can be performed (image blur is in a normal range).

Furthermore, in this embodiment, if it is determined in the image blur discrimination routine (step S210) that correction is disabled, the blur correction is interrupted for a predetermined period of time by the correction interruption routine (step S214; to be described below), and the control is set in a standby state.

Figure 4:
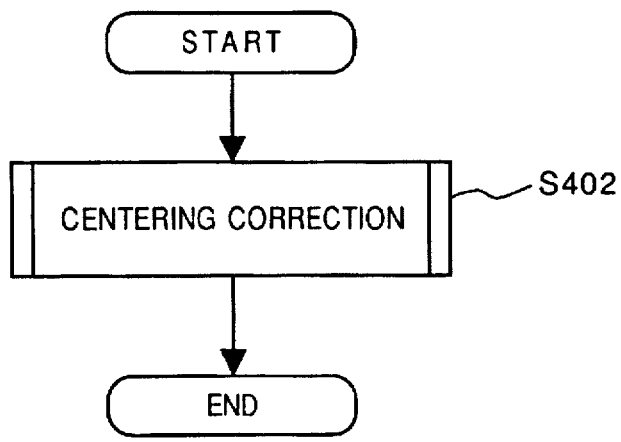
FIG. 4 is a flow chart showing in detail part of the processing shown in FIG. 2.

FIG. 4 is a flow chart showing in detail the processing in step S214.

Figure 7:
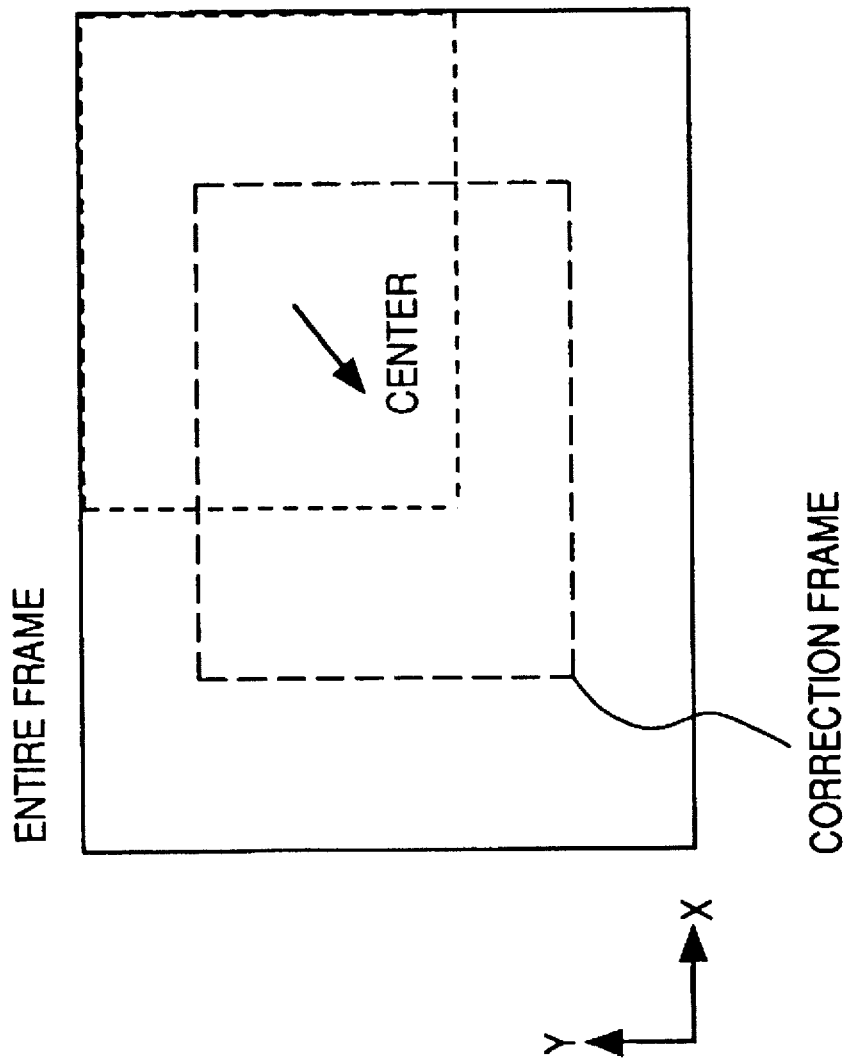
FIG. 7 is a view for explaining movement of a correction frame.

In step S402, after it is determined in the image blur discrimination routine (S210) that the image blur is large, the read address of the field memory 38 is controlled to move a corrected image to the center of the image for a predetermined period of time, as shown in FIG. 7. In this case, another blur correction control is inhibited during movement, thus stabilizing control.

As described above, in this embodiment, even when an image blur exceeding the image blur correction region is generated, it is reliably identified. In this case, blur correction control is inhibited for a predetermined period of time, and the corrected image is moved to the center of the frame, thus minimizing a disturbance of the corrected image without giving a disrupted feeling to a photographer.

(Second Embodiment)

Figure 9:
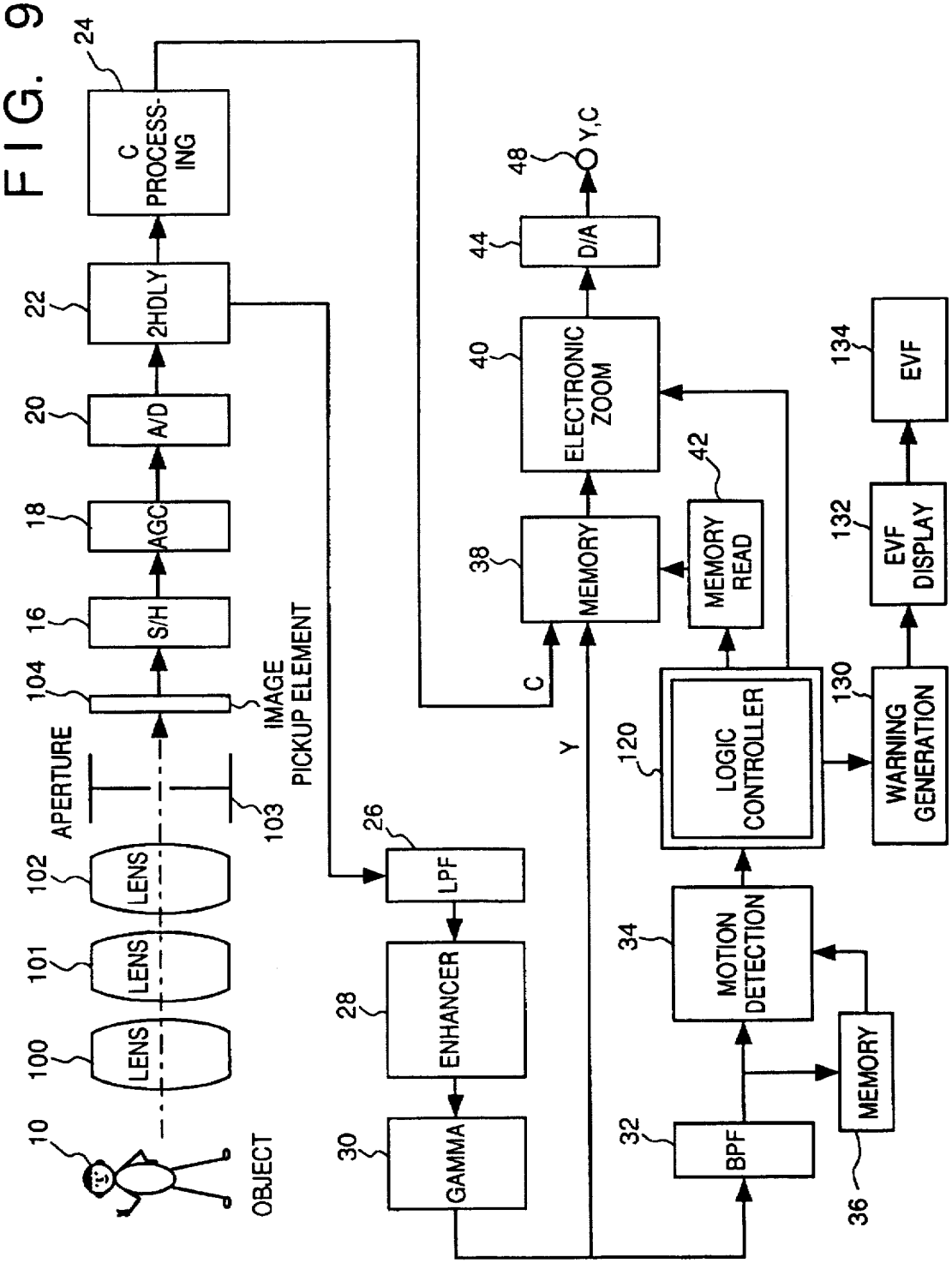
FIG. 9 is a block diagram showing the arrangement of main part of a camera built-in type VTR according to the second embodiment of the present invention.

FIG. 9 is a block diagram showing the arrangement of main part of a camera built-in type VTR according to the second embodiment of the present invention.

The arrangement shown in FIG. 9 is substantially the same as that in FIG. 1, except that a warning generation circuit 130, an electric viewfinder (to be abbreviated as an "EVF" hereinafter) 134 for displaying an image to be photographed or a reproduced image, and a display circuit 132 for controlling the display of the EVF are arranged.

The warning generation circuit 130 is a circuit for causing the EVF 134 to display a warning message when the logic controller 120 determines that a large image blur is generated.

Figure 10:
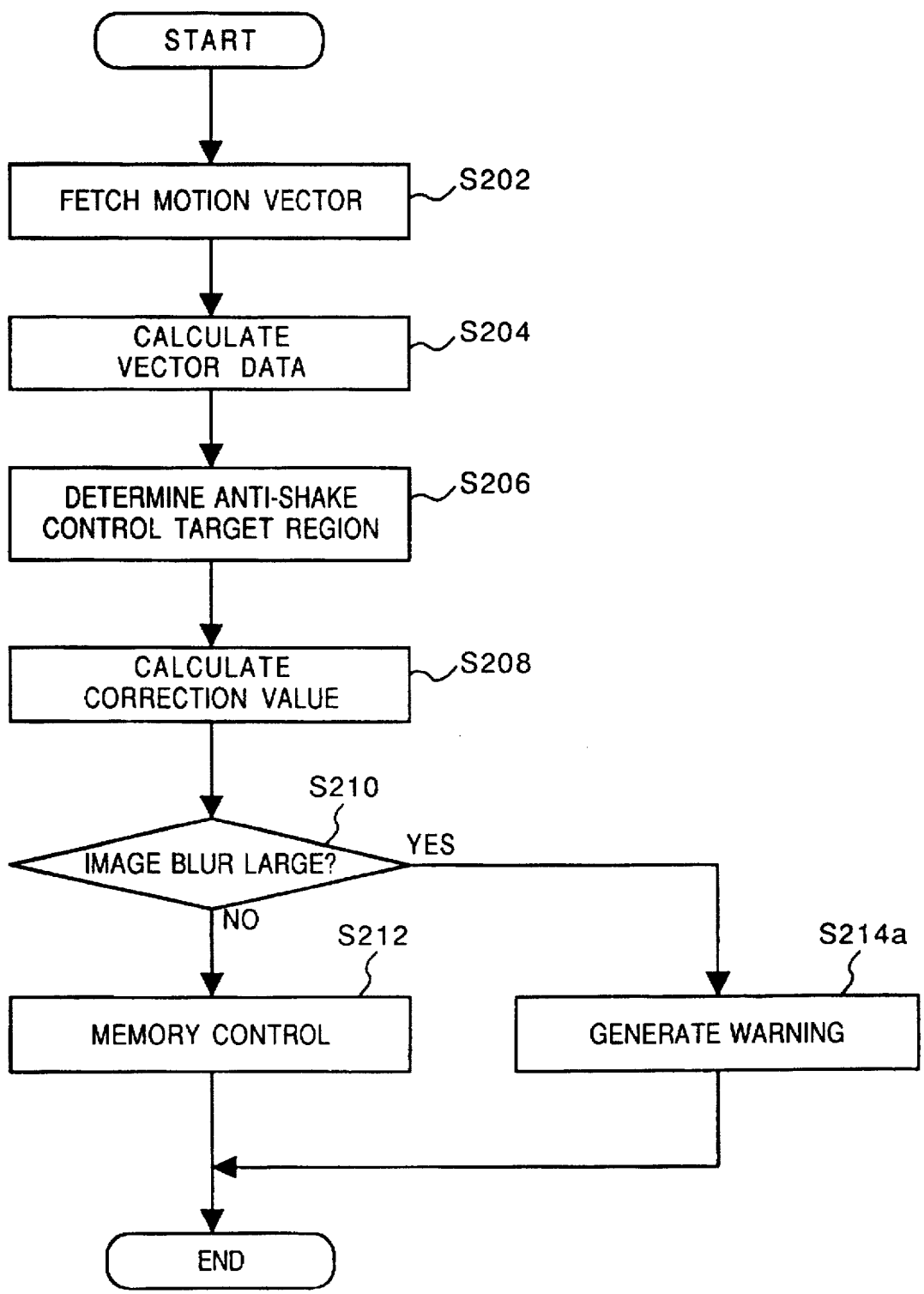
FIG. 10 is a flow chart showing the processing contents in a logic controller in FIG. 9.

FIG. 10 is a flow chart showing the processing contents of the logic controller 120 of this embodiment, and step S214 in the flow chart in FIG. 2 is replaced by step S214a. Steps other than step S214a are the same as those in FIG. 2.

Figure 11:
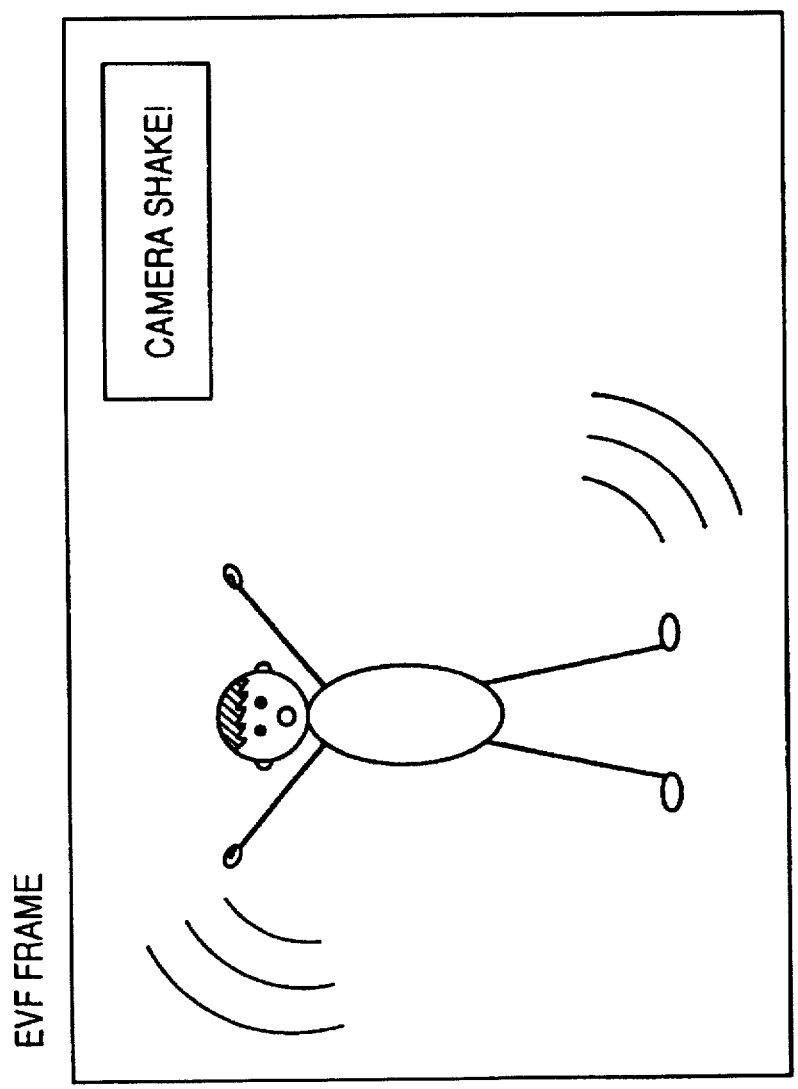
FIG. 11 is a view showing an example of a warning display.

In this embodiment, if the image blur is large, and it is determined that correction is disabled, a command is output to the warning generation circuit 130 to display a warning message, as shown in, e.g., FIG. 11, in the EVF 134. Upon reception of this command, the warning generation circuit 130 controls the EVF display circuit 132 to display the warning message in the EVF.

According to this embodiment, even when an image blur exceeding the image blur correction region occurs, it can be reliably identified. In this case, a warning message is displayed in the EVF to call a photographer's attention, thus preventing a considerably blurred image from being photographed.

Figure 8:
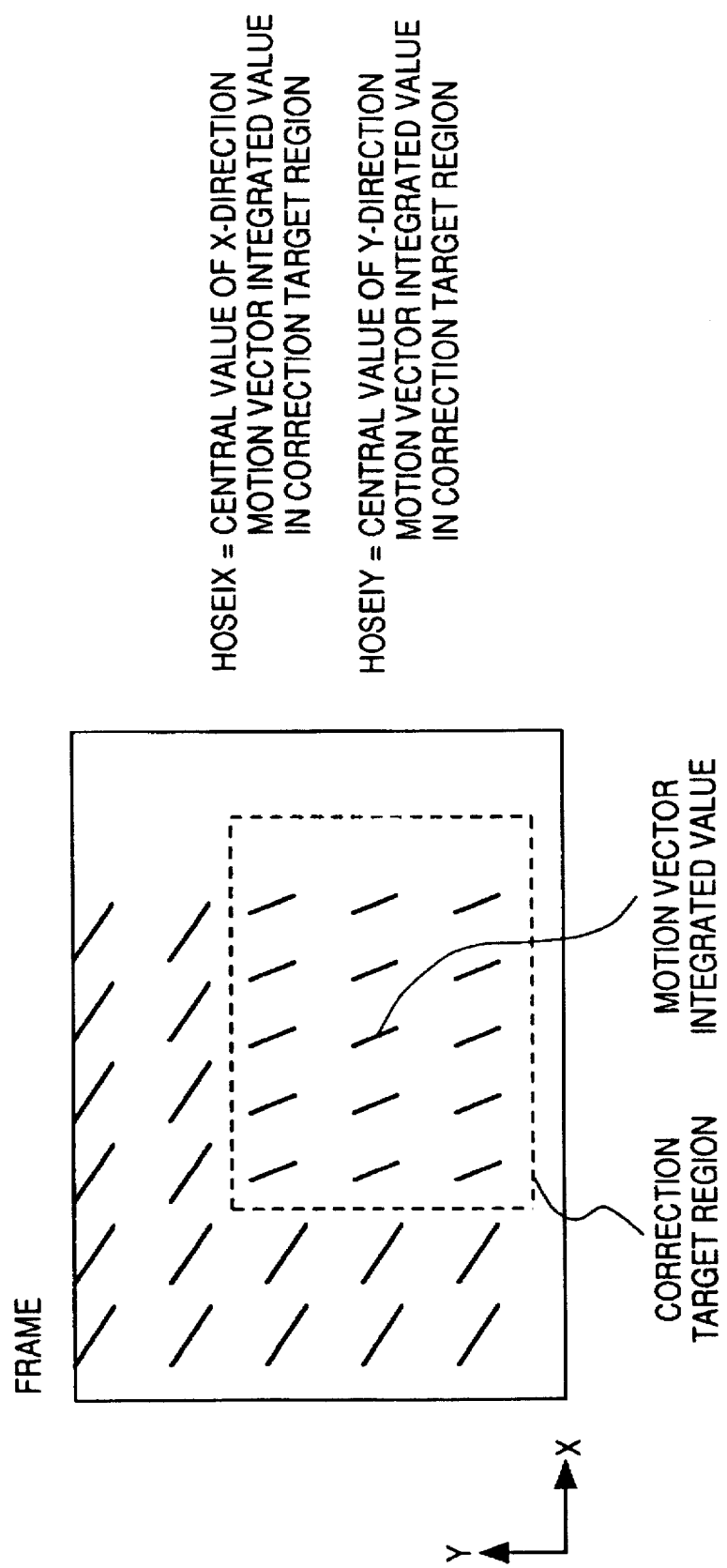
FIG. 8 is a view for explaining a method of calculating correction values (HOSEIX, HOSEIY)

In each of the first and second embodiments described above, in order to calculate final blur correction values, the motion vector integrated values in the correction target region are averaged (see FIG. 5). However, the present invention is not limited to this. For example, as shown in FIG. 8, medians (central values) of the motion vectors in the correction target region may be calculated.

In the second embodiment described above, a warning message is displayed in the EVF 134. However, the present invention is not limited to this. For example, a warning light-emitting diode or the like may be turned on.

As described above, according to the image processing apparatus of the first embodiment, when a state wherein the absolute deviation of an image from the reference point is larger than a predetermined correction value continues for a predetermined period of time or longer, image blur correction is interrupted, thus preventing an image disturbed by the correction from being recorded.

Since the storage position of the correction target frame is moved to a position suitable for correction during interruption of the image blur correction, a disturbance of a corrected image can be minimized without giving a disrupted feeling to a photographer.

According to the image processing apparatus of the second embodiment, when a state wherein the absolute deviation of an image from the reference point is larger than a predetermined correction value continues for a predetermined period of time or longer, a warning to a photographer is generated. For this reason, a considerably blurred image can be prevented from being photographed.

(Third Embodiment)

Since the arrangement of a camera built-in type VTR according to the third embodiment is the same as that of the first embodiment shown in FIG. 1, a detailed description of the arrangement and signal flow of the third embodiment will be omitted. The differences between the third and first embodiments are the processing contents of the logic controller 120.

Figure 12:
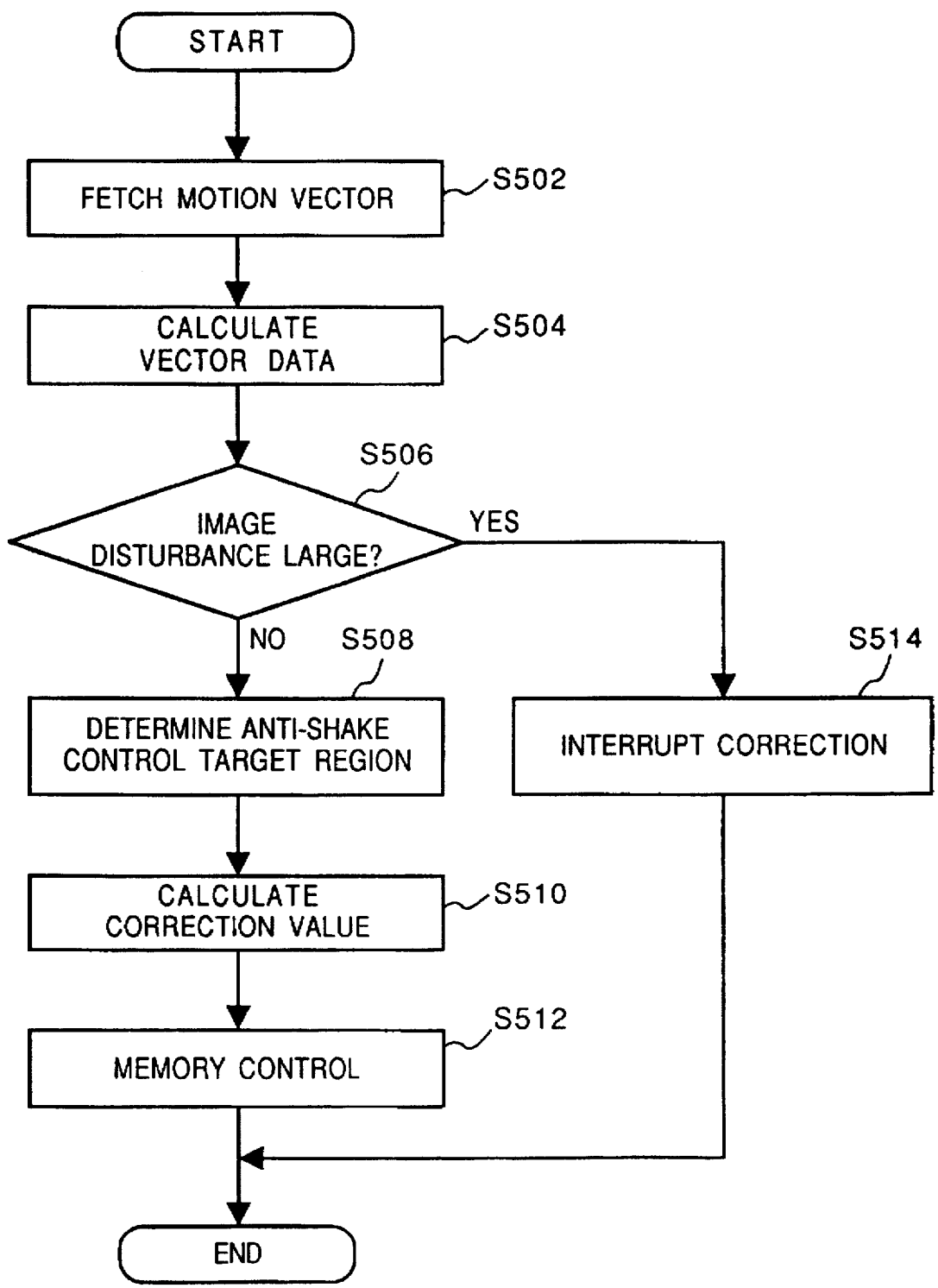
FIG. 12 is a flow chart showing the processing contents in a logic controller according to the third embodiment of the present invention.

FIG. 12 is a flow chart showing the processing contents of the logic controller 120 shown in FIG. 1. The operation of the logic controller 120 will be described in detail below with reference to FIG. 12.

In FIG. 12, in step S502, the output signals (horizontal and vertical components of motion vectors at a predetermined frame position) from the motion vector detection circuit 34 are fetched in units of fields.

In step S504, motion vectors detected at the predetermined frame position, which are fetched in step S502, are integrated to calculate a deviation from the reference position of the frame, thereby obtaining an image blur correction signal. In this case, the reliability of individual motion vectors is evaluated together, and is reflected in the integral operation, thus obtaining a deviation more accurately.

In step S506, an image state is checked based on the motion vectors fetched in step S502, e.g., it is checked if an undesirable object is present in the frame. If it is determined in step S506 that image blur correction is disabled, the flow advances to step S514; otherwise, the flow advances to step S508 and subsequent steps to execute image blur correction. The routines in steps S506 and S514 constitute principal part of the present invention, and will be described in detail later.

In steps S508 to S512, normal image blur correction control is performed.

More specifically, in step S508, a portion including a movement is discriminated on the basis of the motion vectors and the spatial distribution or time variation of the motion vector integrated values calculated in steps S502 and S504, thus determining a correction target region.

In step S510, the motion vector integrated values in the correction target region determined in step S508 are extracted to calculate a final image blur correction value. In this case, it is also checked if the finally calculated image blur correction value has exceeded a correctable region, and predetermined processing is performed if necessary.

In step S512, the image blur correction value calculated in step S510 is converted into the read address of the field memory 38, and a command for actually controlling the memory is issued. Furthermore, a command for supplying a desired enlargement or reduction magnification to the electronic zoom circuit 40 is issued.

The contents of the image state discrimination routine in step S506 and the correction interruption routine in step S514 will be described below with reference to FIGS. 13, 4, and 7.

Figure 13:
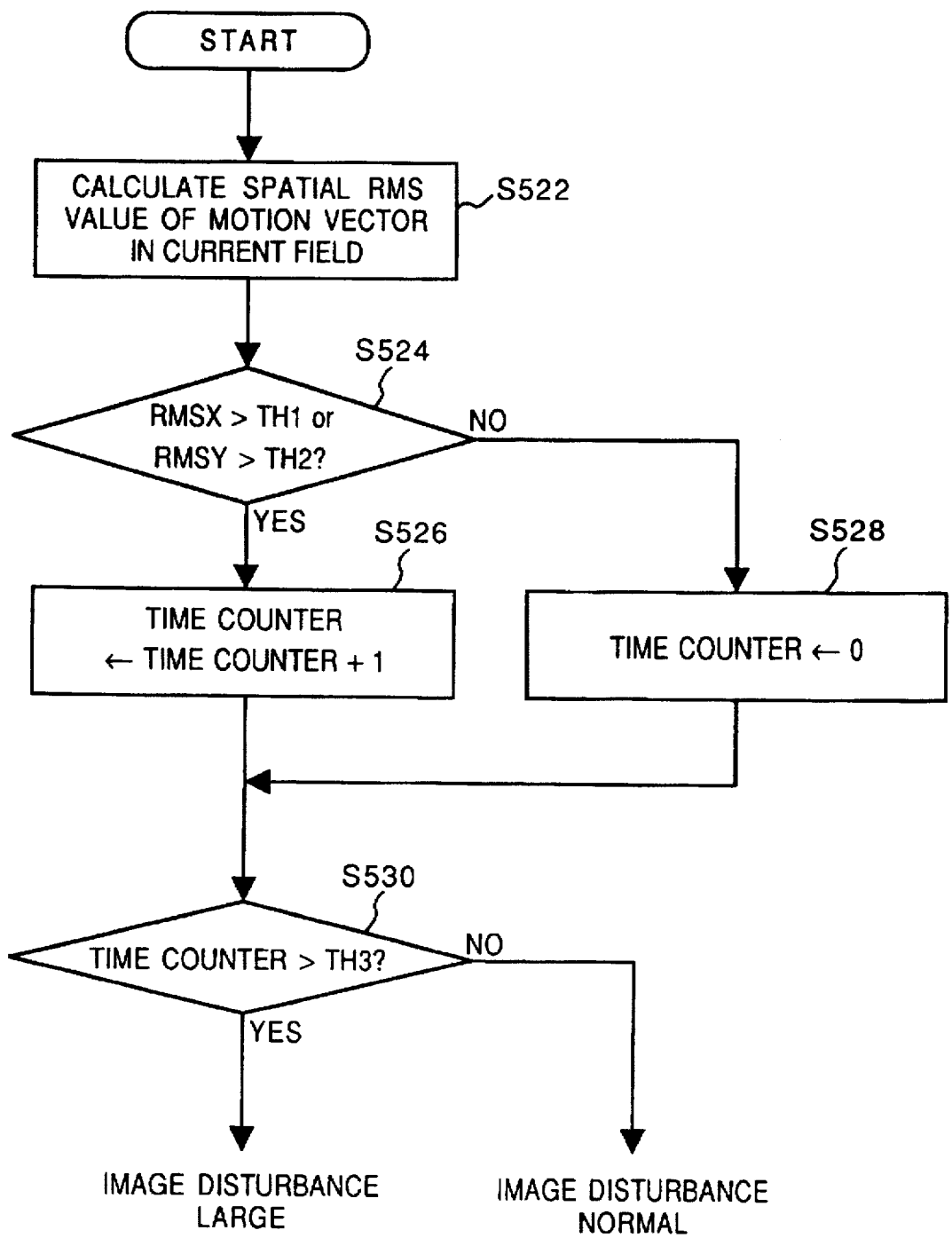
FIG. 13 is a flow chart showing in detail part of the processing shown in FIG. 12.

FIG. 13 is a flow chart showing the details of the image state discrimination routine.

In step S522, spatial disturbance strengths RMSX and RMSY in the X- and Y directions are calculated using the following equations (1) and (2) on the basis of motion vectors between an image one field before and an image of the current field, which vectors are fetched in step S502 in FIG. 12:

$$RMSX = \Sigma \{MVXAVE - MVX(i, j)\}^2 / (i \times j - 1) \quad (1)$$

$$RMSY = \Sigma \{MVYAVE - MVY(i, j)\}^2 / (i \times j - 1) \quad (2)$$

where MVXAVE and MVYAVE are the spatial average values of motion vectors in the X- and Y-directions, MVX(i, j) and MVY(i, j) are the motion vectors in the X- and Y-directions, and i and j are the numbers of motion vectors in the X- and Y-directions.

In step S524, it is checked if at least one of the disturbance strengths RMSX and RMSY in the X- and Y-directions calculated in step S522 has exceeded a predetermined threshold value TH1 or TH2.

If YES in step S524, the value of a time counter is incremented by 1 (step S526). The time counter counts how many times the blur correction value has continuously exceeded the predetermined threshold value. On the other hand, if NO in step S524, the time counter is reset (step S528).

In step S530, it is finally checked if image blur correction can be performed, i.e., if the count value of the time counter has exceeded a predetermined count TH3. More specifically, if YES in step S530, it is determined that many undesirable objects are present in an image state, the motion vector disturbance is large, and image blur correction is disabled. Otherwise, it is determined that correction can be performed. As undesirable objects, for example, the following cases are conceivable: many objects which move randomly are present in the frame, and the moving directions of which cannot be discriminated; a regular repetitive pattern is present, and its movement is not easily discriminated; effective motion vectors cannot be detected due to, e.g., a low contrast, and only noise components are detected; and so on. Also, when many irregular motion vectors are present on the entire frame, correction is disabled.

In general, in a method of calculating an image blur correction value on the basis of a plurality of motion vectors in the frame like in this embodiment, if motion vectors do not have a uniform direction, the accuracy of the correction value is considerably impaired. Such an image state corresponds to, e.g., a case wherein many above-mentioned undesirable objects whose motion vectors are difficult to obtain are present in the frame, or a case wherein an object restlessly moves around in the frame. According to this routine, whether or not an image is in such a state can be reliably identified by quantifying possibility of image blur correction using the spatial disturbance strengths RMSX and RMSY of motion vectors.

Furthermore, in this embodiment, when it is determined in the image state discrimination routine (step S506) that image blur correction is disabled, blur correction is interrupted for a predetermined period of time by the correction interruption routine (step S514) so as not to execute correction carelessly, and the control stands by during this period.

The flow chart showing in detail the processing in step S514 is the same as that shown in FIG. 4.

More specifically, in step S402, after it is determined in the image state discrimination routine that image blur correction is disabled, the read address of the field memory 38 is controlled to move a corrected image to the center of the image over a predetermined period of time, as shown in FIG. 7. In this case, another blur correction control is inhibited during the movement, thus stabilizing control.

As described above, according to this embodiment, even when motion vectors cannot be normally detected like in a case wherein many undesirable objects are present, such a state can be reliably identified by evaluating the disturbance strengths of the vectors. In this case, blur correction control is inhibited for a predetermined period of time, and a corrected image is moved to the center of the frame, thereby minimizing the disturbance of the corrected image without giving a disrupted feeling to a photographer.

(Fourth Embodiment)

The block diagram showing the arrangement of the principal part of a camera built-in type VTR according to the fourth embodiment is the same as that of the second embodiment shown in FIG. 9, and a detailed description thereof will be omitted.

In the fourth embodiment, the warning generation circuit 130 is a circuit for causing the EVF 134 to display a warning message when the logic controller 120 determines that the image disturbance is large.

Figure 14:
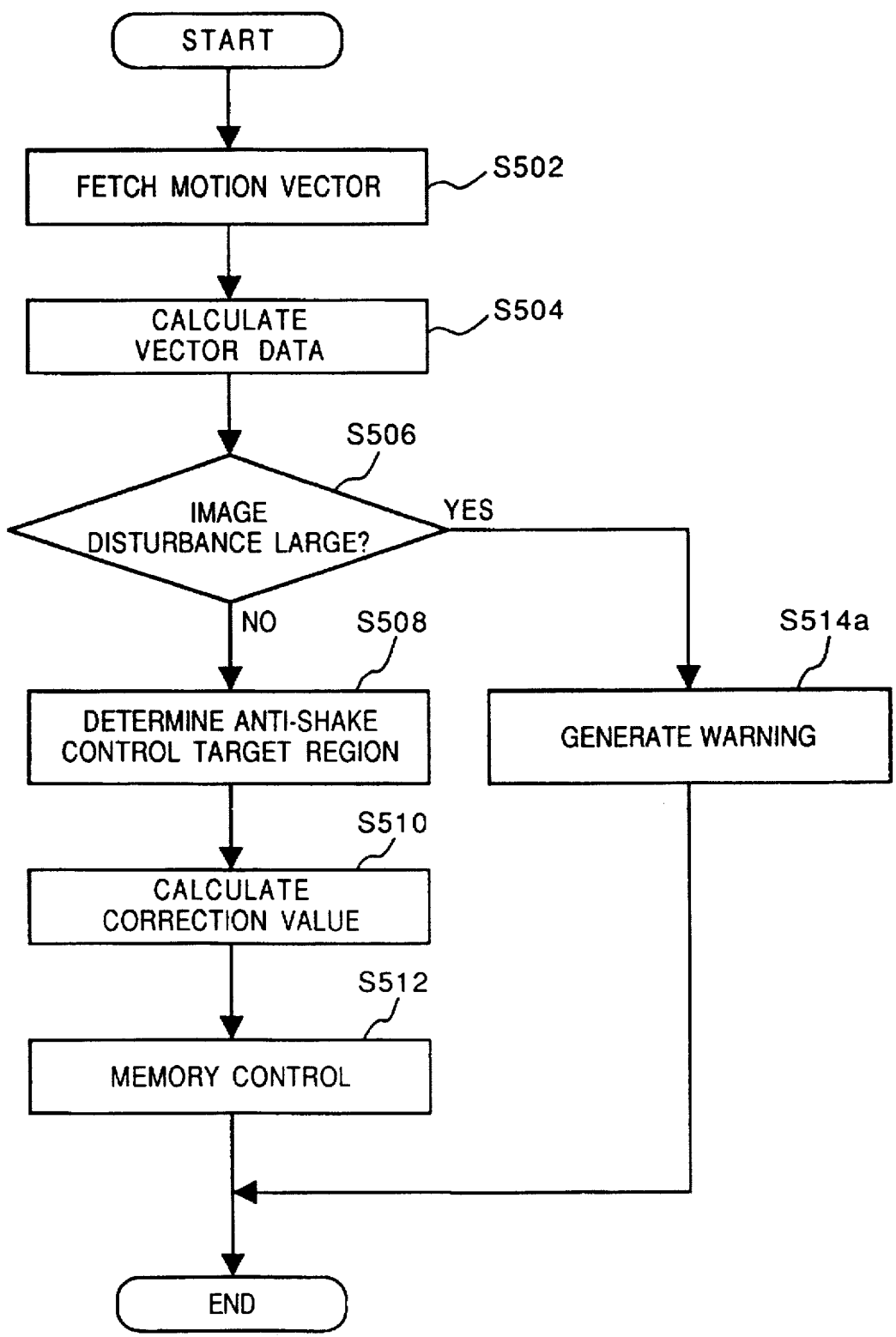
FIG. 14 is a flow chart showing the processing contents in a logic controller according to the fourth embodiment of the present invention.

FIG. 14 is a flow chart showing the processing contents of the logic controller 120 of this embodiment, and in this flow chart, step S514 in the flow chart shown in FIG. 12 is replaced by step S514a. Steps other than step S514a are the same as those in FIG. 12.

In this embodiment, if it is determined that the image disturbance is large, and correction is disabled, a command is output to the warning generation circuit 130, so that a warning message, as shown in, e.g., FIG. 11 is displayed in the EVF 134. Upon reception of this command, the warning generation circuit 130 controls the EVF display circuit 132 to display the warning message in the EVF 134.

According to the fourth embodiment, even when motion vectors cannot be normally detected, such a state can be reliably identified by evaluating the disturbance strengths of the vectors. In this case, a warning message is displayed in the EVF to call a photographer's attention, thus preventing a considerably blurred image from being photographed.

In each of the above-mentioned embodiments, the disturbance strengths of motion vectors are independently calculated in the X- and Y-directions, and possibility of correction is discriminated. However, the present invention is not limited to this. For example, a parameter RMSXY for simultaneously discriminating the strengths in the X- and Y-directions may be calculated using the following equation (3), and when the value RMSXY is equal to or larger than a predetermined value, it can be determined that the image disturbance is large.

$$RMSXY = \Sigma\{(MVXAVE - MVX(i, j))^2 + (MVYAVE - MVY(i, j))^2\}^{1/2}/(i \times j - 1) \quad (3)$$

In the fourth embodiment described above, a warning message is displayed in the EVF 134. However, the present invention is not limited to this. For example, a warning light-emitting diode or the like may be turned on.

As described above, according to the image processing apparatus of the third embodiment, when the disturbance of motion vectors is larger than a predetermined amount, image blur correction is interrupted. For this reason, an image can be prevented from being photographed or recorded in a state wherein the effect of blur correction is insufficient.

Since the storage position of the correction target frame is moved to a position suitable for correction during interruption of the image blur correction, the disturbance of a corrected image can be minimized without giving a disrupted feeling to a photographer.

Also, according to the image processing apparatus of the fourth embodiment, when the disturbance of motion vectors is larger than a predetermined amount, a warning to a photographer is generated. For this reason, a considerably blurred image can be prevented from being photographed or recorded.

(Fifth Embodiment)

The fifth embodiment of the present invention will be described below with reference to FIGS. 15 to 20. Note that the same reference numerals in FIG. 15 denote blocks having the same functions as in FIG. 1.

Figure 15:
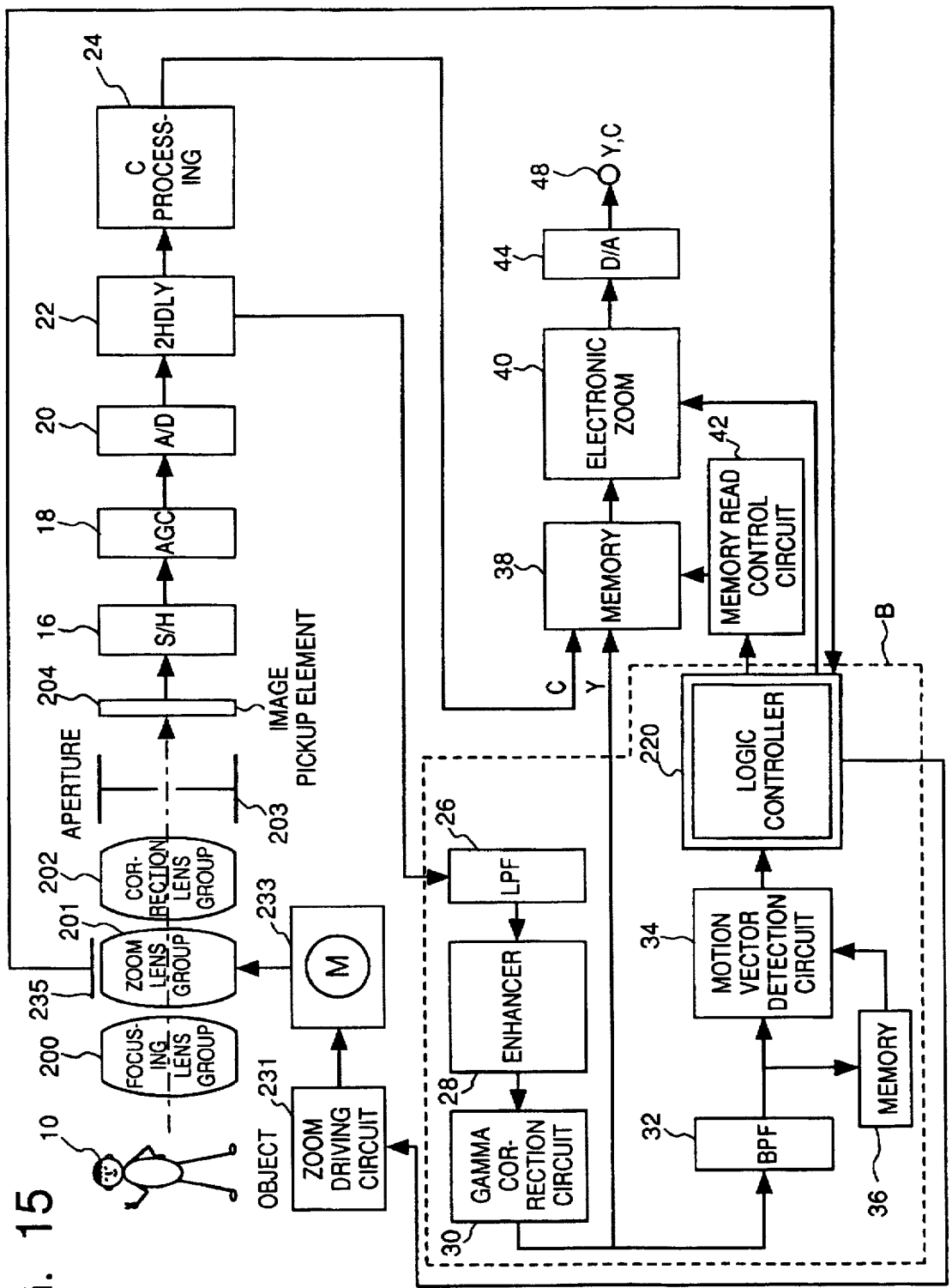
FIG. 15 is a block diagram showing the arrangement of an image processing apparatus according to the fifth embodiment of the present invention.

FIG. 15 is a block diagram showing the arrangement of an image processing apparatus according to the fifth embodiment of the present invention. Referring to FIG. 15, reference numeral 10 denotes an object. An optical image of the object 10 passes through an aperture 203 for adjusting the light amount via a focusing lens group 200 for focusing, a zoom lens group 201 for changing a focal length, and a correction lens group 202 for correcting a change in focal plane caused by zooming, and is focused and imaged on an image pickup element 204 which is arranged behind the aperture 203 and comprises, e.g., a two-dimensional CCD. The image pickup element 204 photoelectrically converts the formed optical image into an image signal, and the image signal is sampled and held by an S/H circuit 16 arranged behind the image pickup element 204. The image signal sampled and held by the S/H circuit 16 is subjected to gain adjustment in an AGC circuit 18 connected to the S/H circuit 16, so as to have a constant signal level, and the adjusted image signal is converted into a digital signal by an A/D converter 20 connected to the AGC circuit 18. The digital image signal is then supplied to a 2-H delay circuit 22 connected to the A/D converter 20.

The 2-H delay circuit 22 separates a color-difference line-sequential signal obtained from the image signal into a 1H delay signal and a (0H+2H) delay signal, and these signals are respectively input to a luminance signal processing unit B and a chrominance signal processing circuit 24, which are connected to the 2-H delay circuit 22. The chrominance signal processing circuit 24 generates a chrominance signal based on the input signal, and the generated chrominance signal is stored in a field memory 38 connected to the chrominance signal processing circuit 24. On the other hand, in the luminance signal processing unit B, the output signal from the delay circuit 22 is input to an LPF 26, and a carrier component is removed from the color-difference line-sequential signal, thus separating a luminance signal. The extracted luminance signal is input to an enhancer 28 connected to the LPF 26, and is subjected to processing for emphasizing high-frequency components by secondary differential components of the image signal to, e.g., edges of an object, so as to improve image quality.

The luminance signal subjected to the above-mentioned emphasis processing is input to a gamma correction circuit 30 connected to the enhancer 28, and is subjected to gamma correction for preventing saturation on a highlight portion and widening the dynamic range. The corrected luminance signal is input to the field memory 38 and a BPF 32, which are connected to the gamma correction circuit 30. The band-pass filter extracts spatial frequency components effective for detection of motion vectors. More specifically, in the BPF 32, high- and low-frequency components in the image signal, which are not suitable for detection of motion vectors, are removed. In this embodiment, only the sign bit of the BPF 32 is output, and the luminance signal is binarized using the DC level as a threshold value. As a result, the luminance signal after the BPF 32 is a 1-bit signal. The BPF 32 is connected to a field memory 36. The luminance signal from the BPF 32 is temporarily stored in the field memory 36 and is delayed by a one-field time. A motion vector detection circuit 34 connected to the field memory 36 executes matching calculations between the luminance signal one field before and the luminance signal of the current field in real time.

The motion vector detection circuit 34 outputs signals corresponding to vertical and horizontal motion vector components, and these signals are input to a logic controller 220 connected to the motion vector detection circuit 34. The logic controller 220 momentarily calculates a deviation of each instantaneous image from the reference position. The calculated deviation signal is input to a memory read control circuit 42 connected to the logic controller 220, and the memory read control circuit 42 controls the read position of the field memory 38 connected to the logic controller 220, so that the calculated deviation position is located at the center, i.e., the motion vectors are canceled. The controlled signal is converted into a desired size by linear interpolation by an electronic zoom circuit 40 connected to the field memory 38, and an image signal obtained by conversion is converted into an analog signal by a D/A converter 44 connected to the electronic zoom circuit 40 as an image signal from which an image blur is corrected. The analog image signal is then output from an output terminal 48.

In this embodiment, a position detection signal of a position encoder of the zoom lens group 201 is input to the logic controller 220. The logic controller 220 is connected to a zoom driving circuit 231, and the zoom driving circuit 231 is connected to a motor 233 for driving the zoom lens group 201. The logic controller 220 has a function of detecting an image blur state on the basis of motion information such as the absolute values, spatial distribution, time distribution, and the like of motion vectors detected by the motion vector detection circuit 34 (blur detection means), a function of operating the zoom driving circuit 231 to move the zoom lens group 201 so as to optically change the blur correction range when it is detected that the image has exceeded a predetermined value (blur correction range control means), and a function of controlling the field angle of an image displayed on an electric viewfinder (EVF) to an optimal value in synchronism with the optical change (field angle control means).

The operation of the logic controller 220 in the image processing apparatus according to this embodiment will be described below with reference to the flow chart shown in FIG. 16.

Figure 16:
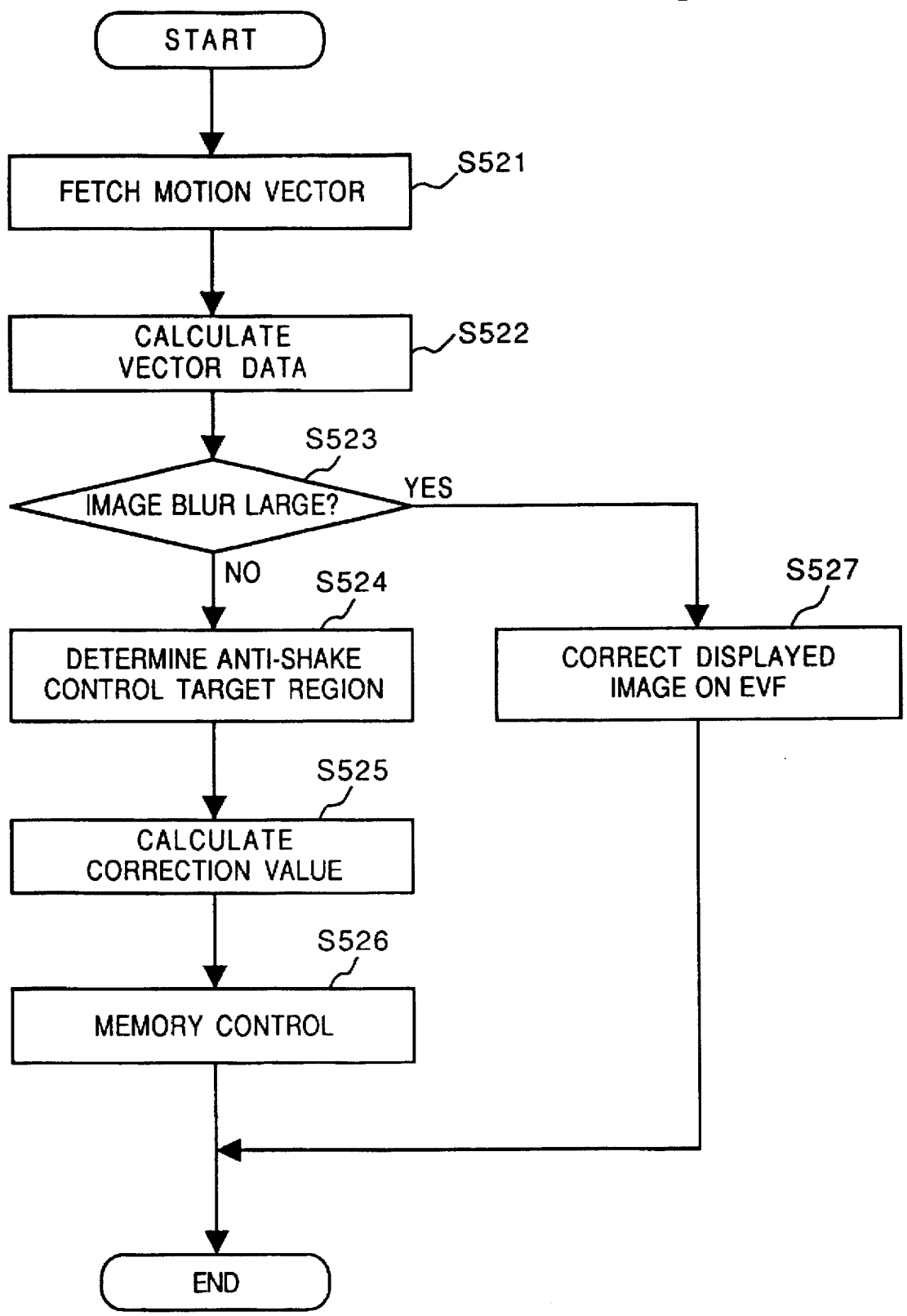
FIG. 16 is a flow chart showing the operation of a logic controller in the image processing apparatus shown in FIG. 15.

FIG. 16 is a flow chart showing the operation of the logic controller 220. In step S521 in FIG. 16, the logic controller 220 fetches signals corresponding to horizontal and vertical motion vector components from the motion vector detection circuit 34 in units of fields, and the flow advances to step S522. In step S522, the logic controller 220 integrates motion vectors at a predetermined frame position to calculate a deviation from the reference position on a frame, calculates an image blur on the basis of the calculated deviation, and then calculates an image blur correction signal for correcting the calculated image blur. In the deviation calculations in this case, the reliability of individual motion vectors is also evaluated, and is reflected in integral processing, thus allowing more accurate deviation calculations.

The flow then advances to step S523, and the logic controller 220 checks based on the motion vectors fetched in step S521 if the current image blur has exceeded a detection range of the motion vector detection circuit 34. If YES in step S523, it is determined that image blur correction is disabled in the current state, and the flow advances to step S527 to execute processing for widening the correction region. On the other hand, if NO in step S523, this means that blur correction can be performed, and the flow advances to step S524. In step S524, the logic controller 220 determines a correction target region, for which an anti-shake operation is to be performed based on a blurred region in the frame, on the basis of the motion vectors fetched in step S521 and the spatial distribution or time variation of the integrated values of the motion vectors calculated in step S522. Thereafter, the flow advances to step S525.

In step S525, the logic controller 220 extracts motion vector integrated values in the correction target region determined in step S524 to calculate a final image blur correction value. The flow then advances to step S526. In step S526, the logic controller 220 converts the image blur correction value calculated in step S525 into the read address of the field memory 38, issues a command for actually controlling the memory, and shifts the read-out range of an image from the memory on the basis of the image blur correction value, thus canceling the motion of an image. Then, a command for giving a desired enlargement or reduction magnification corresponding to the read-out range from the memory to the electronic zoom circuit 40 is generated, and the field angle of a final output image is restored to a normal field angle.

The image blur discrimination operation and the correction region change operation in the image processing apparatus according to this embodiment will be described below with reference to FIGS. 17 to 20.

Figure 17:
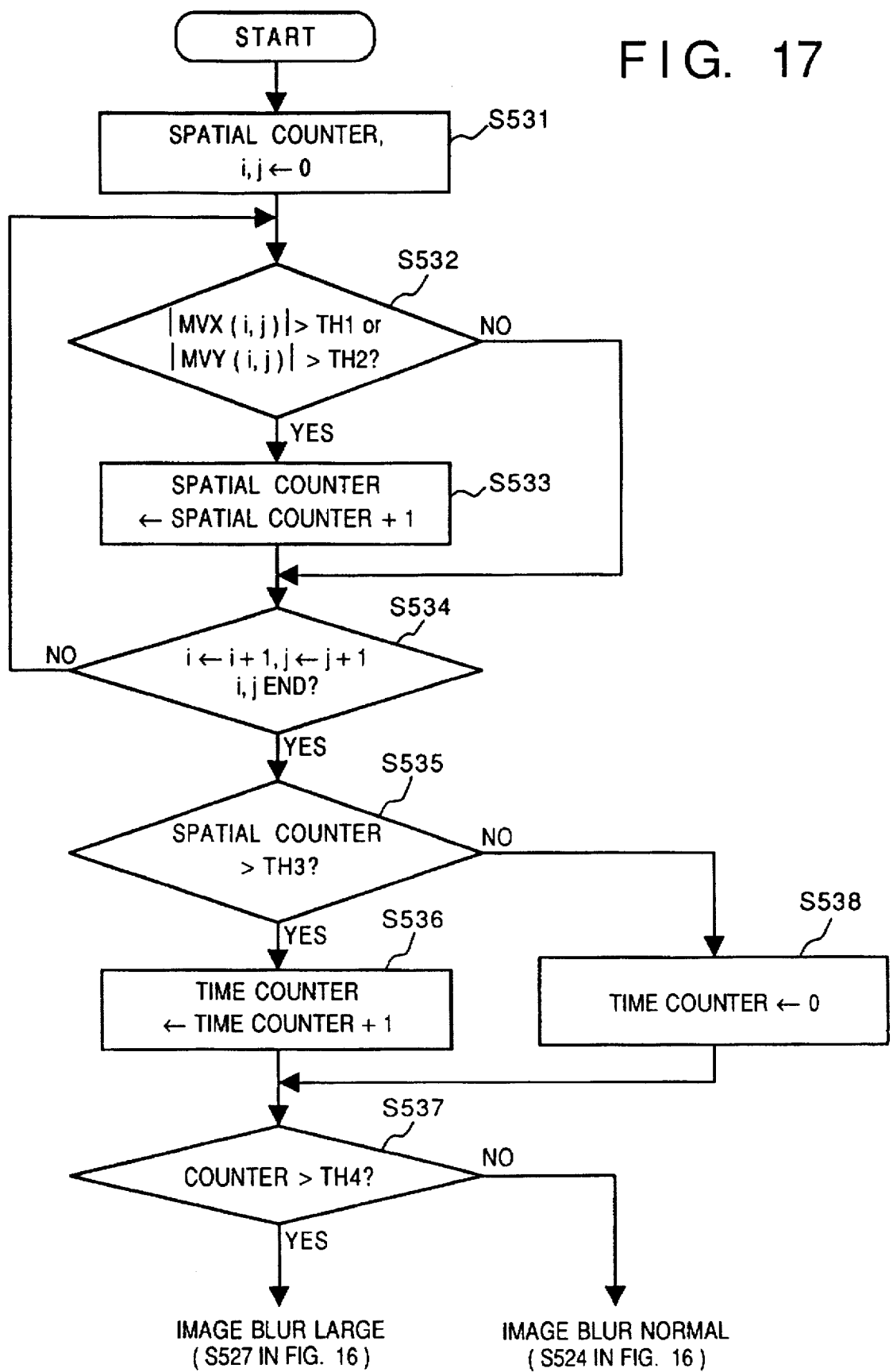
FIG. 17 is a flow chart showing the image blur discrimination operation in the image processing apparatus shown in FIG. 15.
Figure 18:
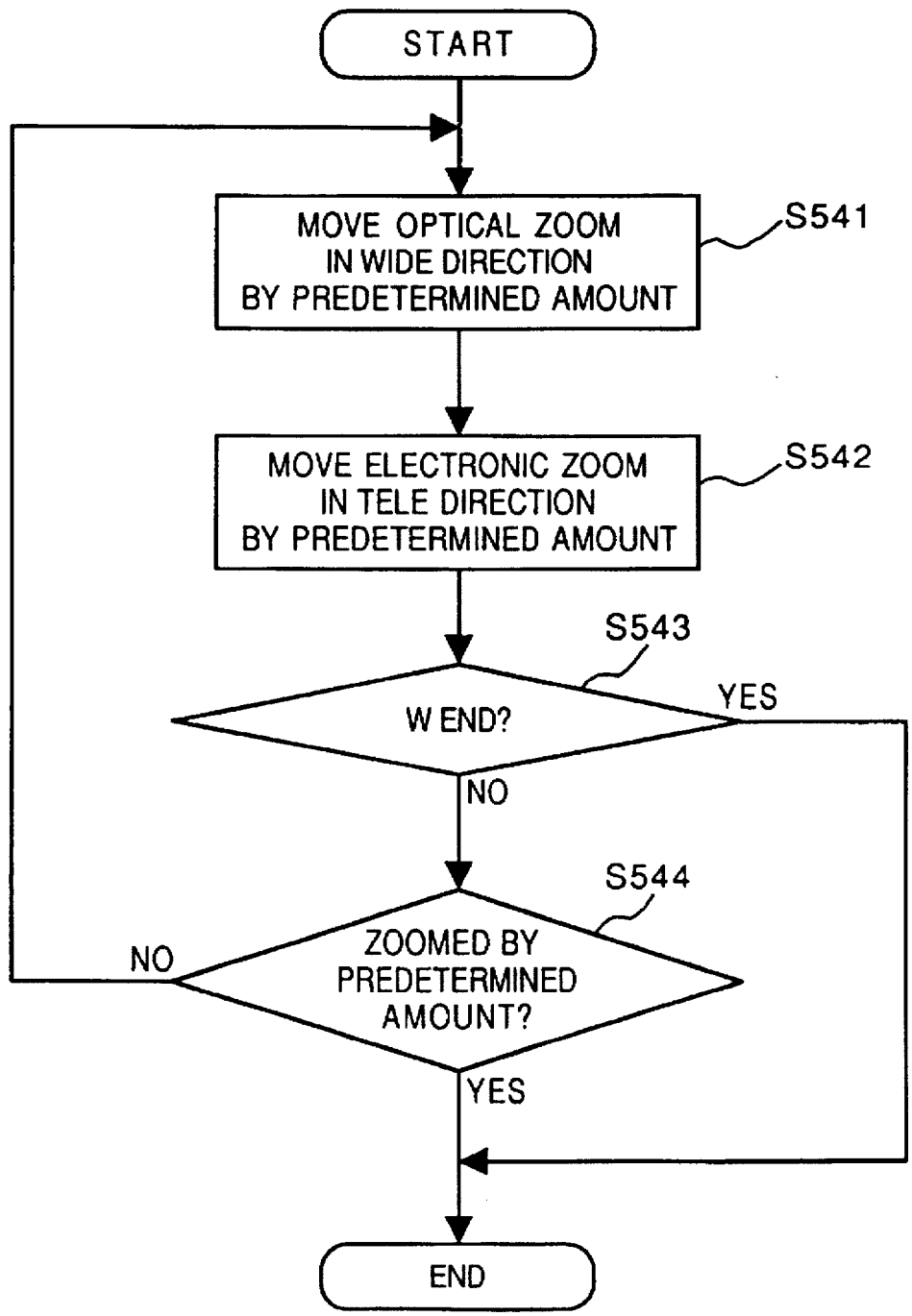
FIG. 18 is a flow chart showing the display image correction operation in the image processing apparatus shown in FIG. 15.
Figure 19:
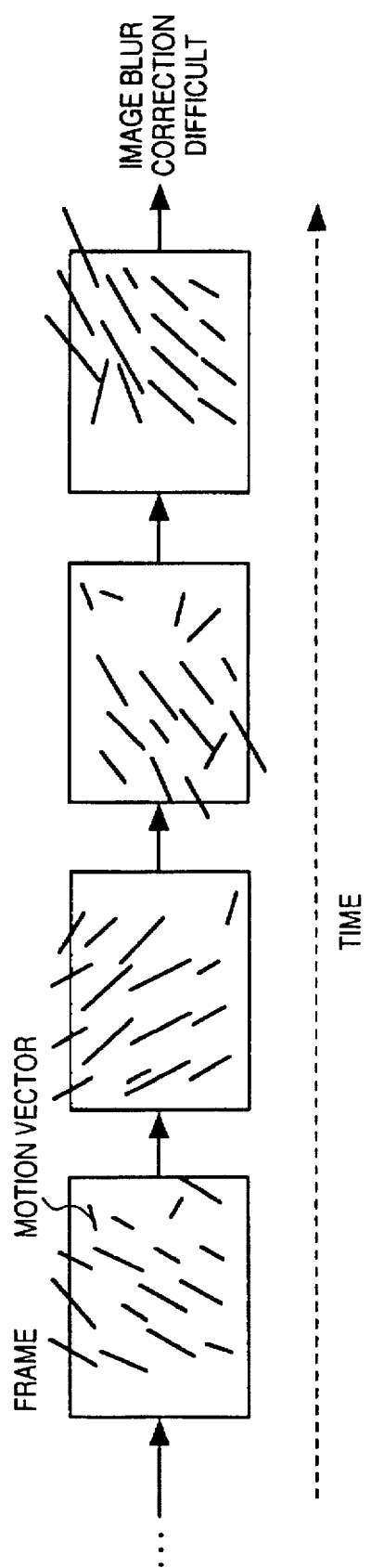
FIG. 19 is an explanatory view of motion vectors in the image processing apparatus shown in FIG. 15.
Figure 20:
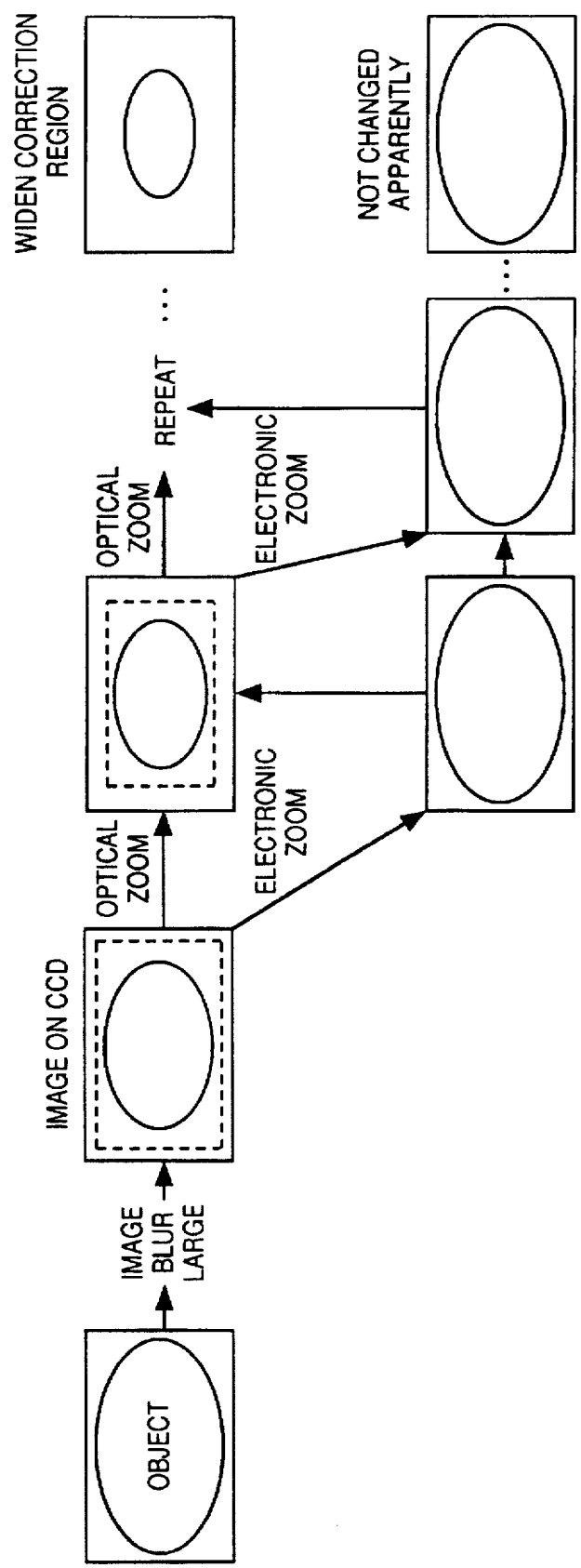
FIG. 20 is an explanatory view of the correction region change operation in the image processing apparatus shown in FIG. 15.

FIG. 17 is a flow chart showing the image blur discrimination operation, FIG. 18 is a flow chart showing the correction region change operation, FIG. 19 is an explanatory view of motion vectors, and FIG. 20 is an explanatory view of the correction region change operation.

In step S531 in FIG. 17, the logic controller 220 resets a detection frame position (i, j) of a spatial counter for detecting whether or not motion vectors in the frame have exceeded a predetermined amount, and the flow advances to step S532. In step S532, it is checked if an X-direction motion vector MVX(i, j) and a Y-direction motion vector MVY(i, j) at a position (i, j) have respectively exceeded predetermined threshold values TH1 and Th2. These threshold values TH1 and TH2 are set to be maximum motion amounts which can be detected by the motion vector detection circuit 34. If it is determined in step S532 that at least one of the X-direction motion vector MVX(i, j) and the Y-direction motion vector MVY(i, j) at the position (i, j) has exceeded the corresponding threshold value TH1 or TH2, the flow advances to step S533 to increment the spatial counter. Thereafter, the flow advances to step S534. On the other hand, if it is determined in step S523 that neither the X-direction motion vector MVX(i, j) nor the Y-direction motion vector MVY(i, j) at the position (i, j) exceed the threshold values TH1 and TH2, the flow skips step S533 and directly jumps to step S534.

In step S534, it is checked if processing of all the motion vectors in the frame is completed. If NO in step S534, the flow returns to step S532; otherwise, the flow advances to step S535 to check if the number of positions where the motion vectors have exceeded the threshold value in the frame has exceeded a predetermined value TH3. If YES in step S535, the flow advances to step S536 to increment the time counter; otherwise, the flow advances to step S538 to reset the time counter.

After execution of step S536 or S538, the flow advances to step S537 to check if the count value of the time counter has exceeded a predetermined value TH4. If YES in step S537, it is determined that an image blur has finally exceeded the detection region, and is too large to perform correction. The flow advances to step S527 in FIG. 16 to change the correction region. However, if NO in step S537, it is determined that the image blur is in a normal range, and the flow advances to step S524 in FIG. 16 to continue image blur correction.

In general, when the image blur amount is large, the spatial distribution of the detected motion vectors does not always increase as the image blur amount increases. As shown in FIG. 19, the detection motion vectors are largely offset, and a nonuniform spatial distribution is often detected. In contrast to this, in this embodiment, processing is executed while adequately evaluating the spatial or time distribution of the motion vectors, and it can be accurately identified that image blur correction is difficult to achieve. In this embodiment, when it is determined that the image blur has exceeded the predetermined value, the correction range is widened without giving a disrupted feeling to a photographer, as described above, so as to allow image blur correction.

If it is determined in step S537 in FIG. 17 that it is impossible to correct an image blur in the current state, the flow advances to step S541 in FIG 18 showing the routine in step S527 in FIG. 16. In step S541, the logic controller 220 operates the zoom driving circuit 231 to supply predetermined driving pulses to he motor 233, and the motor 233 moves the zoom lens group 201 in the wide direction by a predetermined amount inconspicuous to a photographer. The flow then advances to step S542, and an electronic zooming operation is performed in the tele direction by the same amount as the field angle optically widened in step S541 in accordance with a command from the logic controller 220. In this case, a change in field angle is managed based on driving pulses of the zoom lens group 201, and can be logically calculated. For this reason, processing for changing the memory read position of the field memory 38 and changing the enlargement magnification to be given to the electronic zoom circuit 40 in correspondence with the change in field angle need only be executed.

FIG. 20 shows the operation states in steps S541 and S542. When optical and electronic zooming operations are alternately repeated by a small amount, the actual field angle is changed by an amount inconspicuous to a photographer, thus widening the correction region.

Referring back to the flow chart in FIG. 18, it is checked in step S543 if the zoom lens group 201 contacts the wide end by the optical zooming operation. If YES in step S543, the zooming operation is immediately interrupted in accordance with a command from the logic controller 220, and anti-shake control at the field angle at that time is performed. However, if NO in step S543, the flow advances to step S544, and whether or not the widening processing of the predetermined field angle has been completed is checked by monitoring the relative change or difference between the number of pulses of the motor 233 at the beginning of the operation and the current number of pulses. When the relative change amount has exceeded a predetermined value, it is determined that the widening processing of the field angle has been completed.

As described above, according to the fifth embodiment, when an image blur has exceeded the detection range, it is accurately detected that correction is disabled in the current state, and in this state, the correction region is widened without changing the apparent field angle of the EVF, thus allowing image blur correction without giving a disrupted feeling to a photographer.

(Sixth Embodiment)

The sixth embodiment of the present invention will be described below with reference to FIG. 21.

In the fifth embodiment, in the image blur discrimination routine in FIG. 17, when a predetermined condition is not satisfied continuously, the time counter is reset. However, in this embodiment, if the value of the time counter in a predetermined previous field is equal to or larger than a predetermined value, it is determined that the image blur is large.

Figure 21:
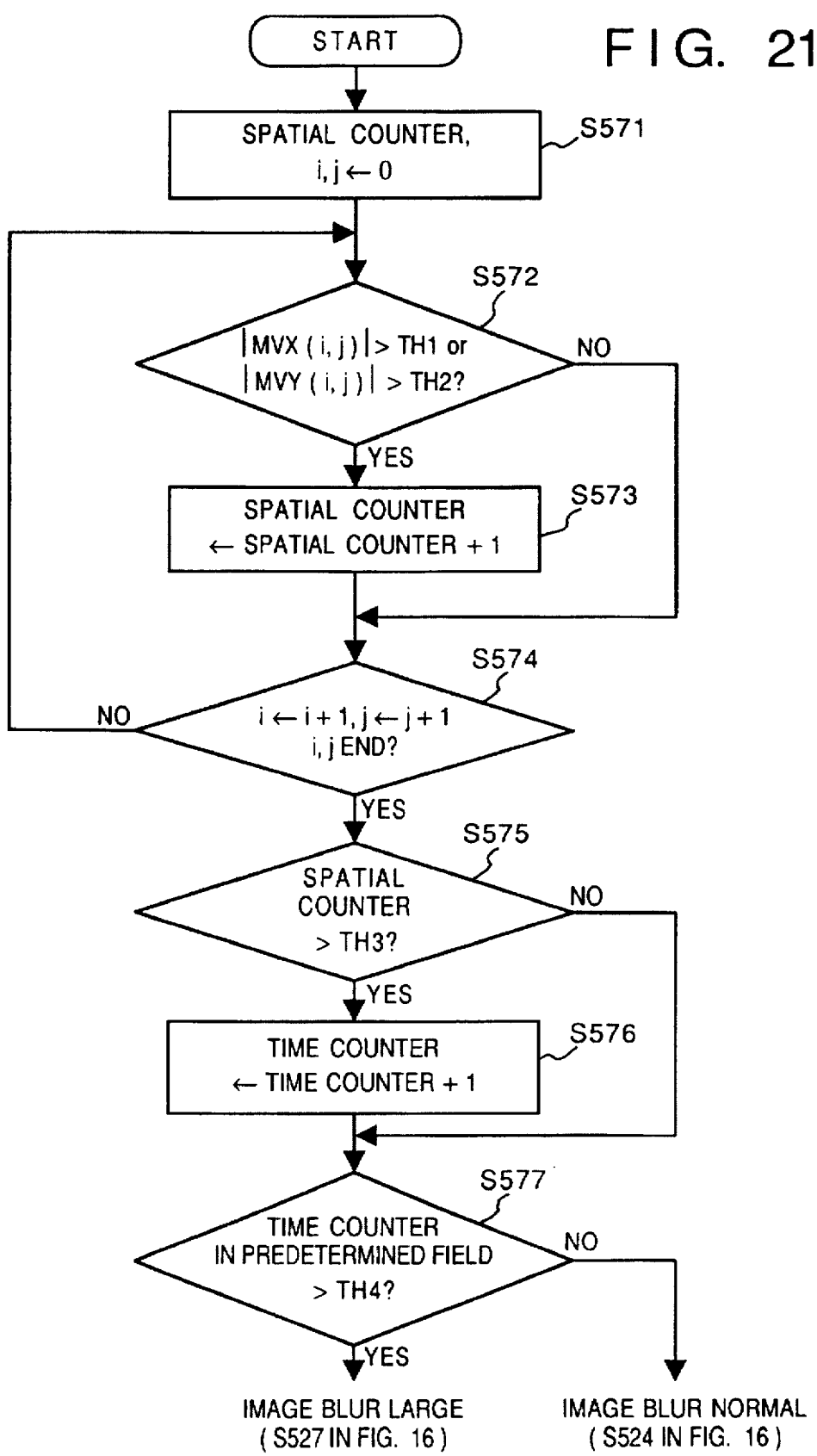
FIG. 21 is a flow chart showing the image blur discrimination operation in an image processing apparatus according to the sixth embodiment of the present invention.

FIG. 21 is a flow chart showing the image blur discrimination operation in the image processing apparatus of this embodiment. Referring to FIG. 21, since steps S571 to S576 are the same as steps S531 to S536 in FIG. 17 in the fifth embodiment, a detailed description thereof will be omitted. If it is determined in step S577 that the time counter in a predetermined field has exceeded a predetermined value TH4, it is determined that an image blur is too large to perform correction, and the flow advances to step S527 in FIG. 16 to change the correction region. On the other hand, if it is determined in step S577 that the time counter in a predetermined field does not exceed the predetermined value TH4, it is determined that the image blur is in a normal range, and the flow advances to step S524 in FIG. 16 to continue image blur correction.

Note that other arrangements and effects of this embodiments are the same as those in the fifth embodiment.

(Seventh Embodiment)

Figure 22:
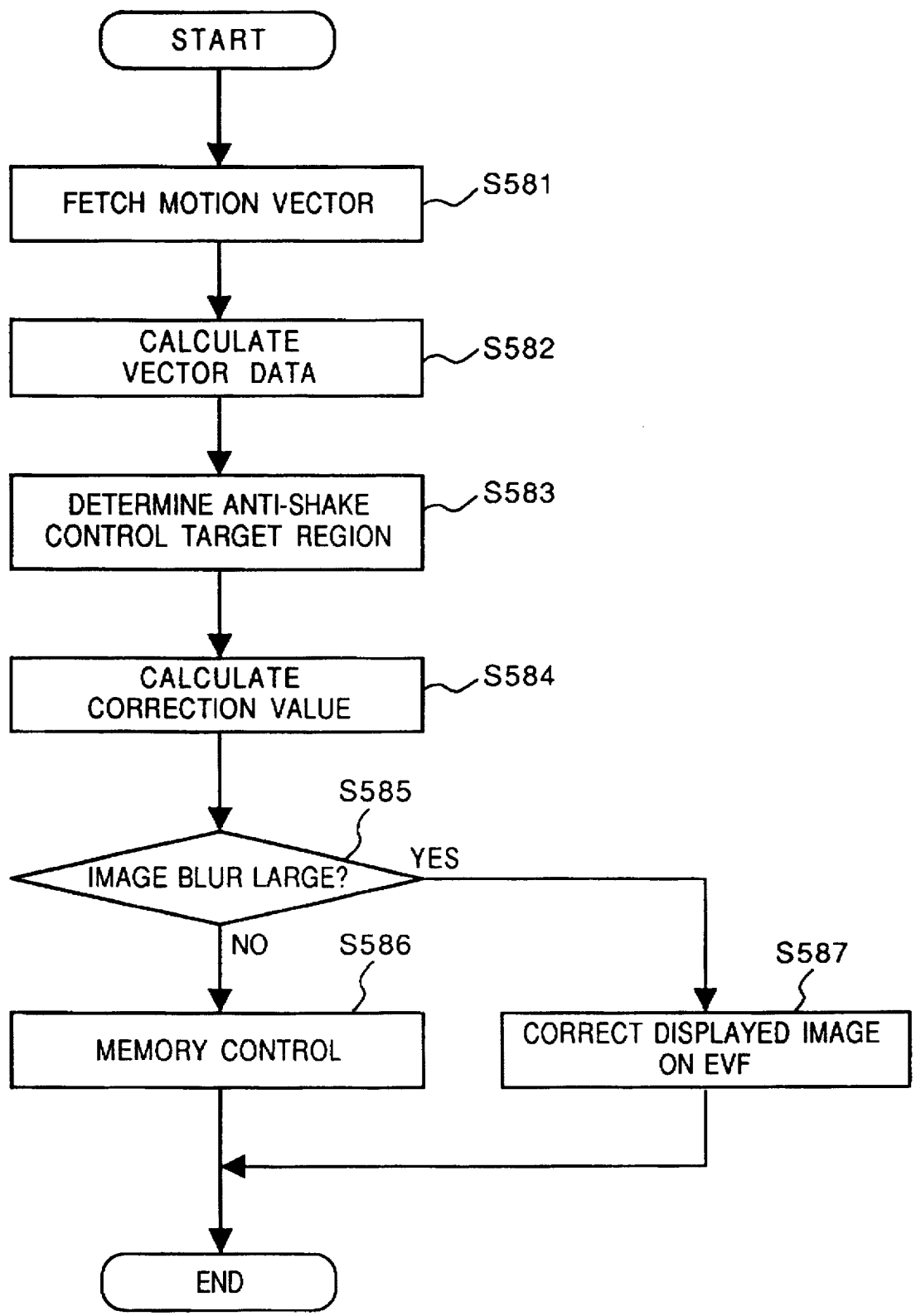
FIG. 22 is a flow chart showing the operation of an image processing apparatus according to the seventh embodiment of the present invention.
Figure 23:
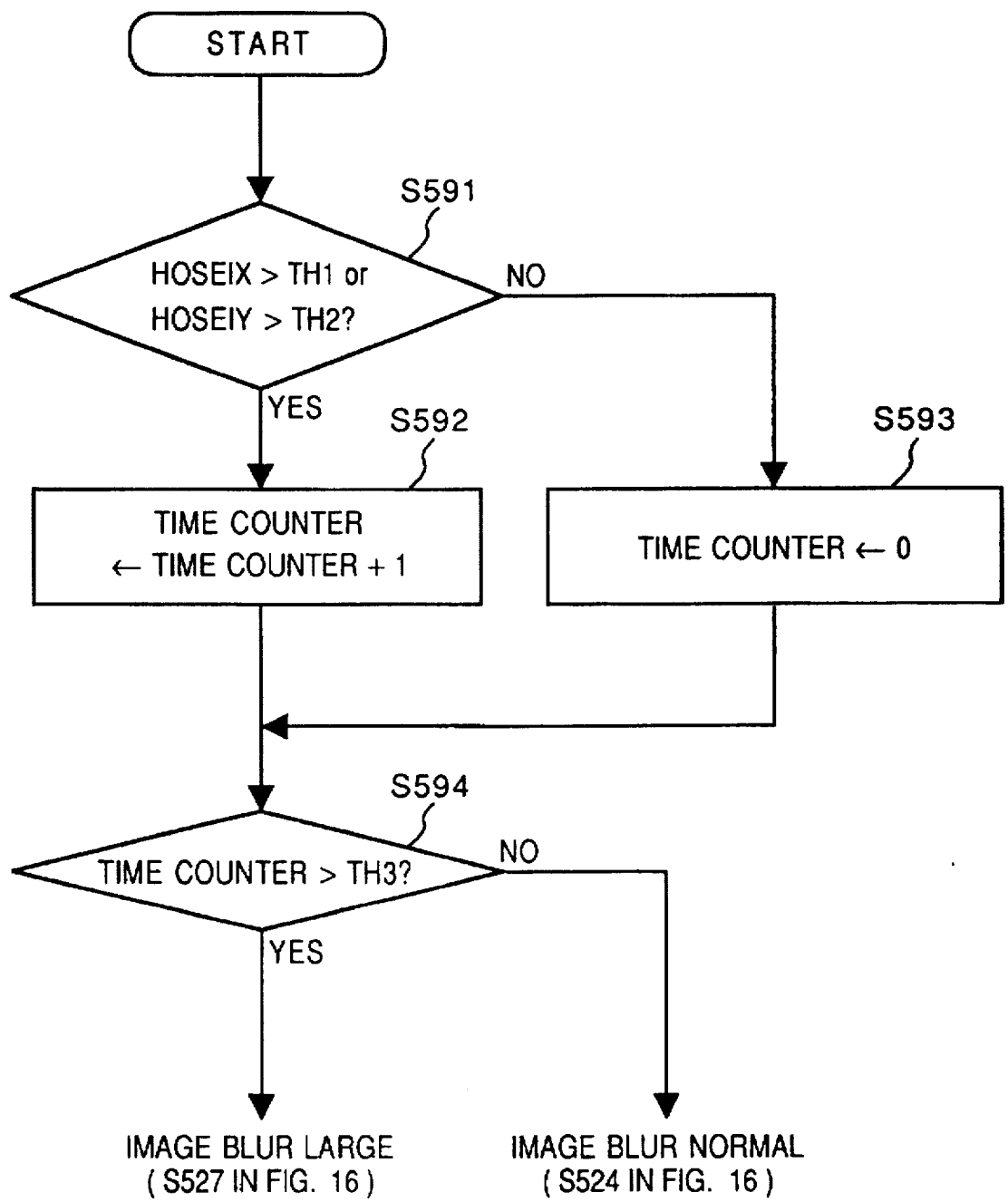
FIG. 23 is a flow chart showing the image blur discrimination operation in the image processing apparatus shown in FIG. 22.

The seventh embodiment of the present invention will be described below with reference to FIGS. 22 and 23. FIG. 22 is a flow chart showing the operation of a logic controller in an image processing apparatus according to this embodiment, and FIG. 23 is a flow chart showing the image blur discrimination operation in the image processing apparatus of this embodiment.

Since the image processing apparatus according to this embodiment has basically the same arrangement as that of the fifth embodiment shown in FIG. 15, the following description will be made by referring to FIG. 15. In particular, the logic controller of this embodiment has the following function. That is, the logic controller adds motion vectors detected by the motion vector detection circuit 34 to calculate an absolute deviation of an image from the reference point. When the calculated value has successively exceeded a reference correction value a predetermined number of times, the logic controller operates the zoom driving circuit 231 to move the zoom lens group 201, thereby optically changing the blur correction range. At the same time, the logic controller controls the field angle of an image displayed on the electric viewfinder (EVF) to an optimal value in synchronism with the optical change. Since other arrangements of this embodiment are the same as those in the fifth embodiment, a detailed description thereof will be omitted.

The operation of the image processing apparatus according to this embodiment will be described below with reference to the flow chart in FIG. 22.

In step S581, the logic controller 220 fetches signals corresponding to horizontal and vertical motion vector components from the motion vector detection circuit 34 in units of fields, and thereafter, the flow advances to step S582. In step S582, the logic controller 220 integrates motion vectors at a predetermined frame position to calculate a deviation from the reference position on the frame, and calculates an image blur correction signal on the basis of the calculated deviation. In the deviation calculations, the reliability of individual motion vectors is also evaluated, and is reflected in the integral processing, thus allowing more accurate deviation calculations.

The flow advances to step S583, and the logic controller 220 determines a correction target region on the basis of the motion vectors fetched in step S581 and the spatial distribution or time variation of the integrated values of the motion vectors calculated in step S582. Thereafter, the flow advances to step S584. In step S584, the logic controller 220 extracts motion vector integrated values in the correction target region determined in step S583 to finally obtain X- and Y-direction blur correction values HOSEIX and HOSEIY as final image blur correction values.

The flow advances to step S585, and the logic controller 220 checks based on the motion vectors fetched in step S581 if the current image blur has exceeded a correction limit region. If YES in step S585, it is determined that image blur correction is disabled in the current state, and the flow advances to step S587 to execute widening processing of the correction region. However, if NO in step S585, the flow advances to step S586. In step S586, the logic controller 220 converts the image blur correction values calculated in step S584 into the read address of the field memory 38, issues a command for actually controlling the memory, and shifts the read-out range of an image from the memory on the basis of the image blur correction values, thereby canceling the motion of the image. In addition, a command for giving a desired enlargement or reduction magnification corresponding to the size of the read-out range from the memory to the electronic zoom circuit 40 is issued, and the field image of a final output image is restored to a normal field angle.

The image blur discrimination operation in the image processing apparatus of this embodiment will be described below with reference to the flow chart in FIG. 23.

In step S591, it is checked if at least one of the X- and Y-direction blur correction values HOSEIX and HOSEIY calculated in step S584 in FIG. 22 has exceeded a corresponding predetermined threshold value TH1 or TH2. Note that the X- and Y-direction blur correction values HOSEIX and HOSEIY are average values of motion vector integrated values in the correction target region calculated in step S584 in FIG. 22, as has already been described above with reference to FIG. 5. Also, the threshold values TH1 and TH2 are offset values set with respect to the center in the X- and Y-directions upon cutting of an image at a predetermined reduction magnification from the field memory 38 (see FIG. 15), as shown in FIG. 6, i.e., limit values capable of correcting an image blur.

If it is determined in step S591 that at least one of the X- and Y-direction blur correction values HOSEIX and HOSEIY has exceeded the corresponding predetermined threshold value TH1 or TH2, the flow advances to step S592 to increment a time counter for counting how many times the blur correction value has exceeded the predetermined threshold value. On the other hand, if it is determined that neither of the x- and Y-direction blur correction values HOSEIX and HOSEIY exceed the corresponding threshold values TH1 and TH2, the flow advances to step S593 to reset the time counter. After execution of step S592 or S593, the flow advances to step S594 to check if the count value of the time counter has exceeded a predetermined count. If YES in step S594, it is determined that the final correction value has already largely exceeded the correction limit region (see FIG. 6), and correction can no longer be performed in the current state.

In this manner, if it is determined in step S594 that the count value of the time counter has exceeded the predetermined count, the same widening processing of the correction region as in the fifth embodiment, which has been described above with reference to FIG. 18, is executed to change the actual field angle by an amount inconspicuous to a photographer.

As described above, according to the seventh embodiment, when an image blur has exceeded the detection range, it is accurately detected that correction is disabled in the current state, and in this state, the correction region is widened without changing the apparent field angle of the EVF, thus allowing image blur correction without giving a disrupted feeling to a photographer.

19

(Eighth Embodiment)

The eighth embodiment of the present invention will be described below with reference to FIG. 24.

Figure 24:
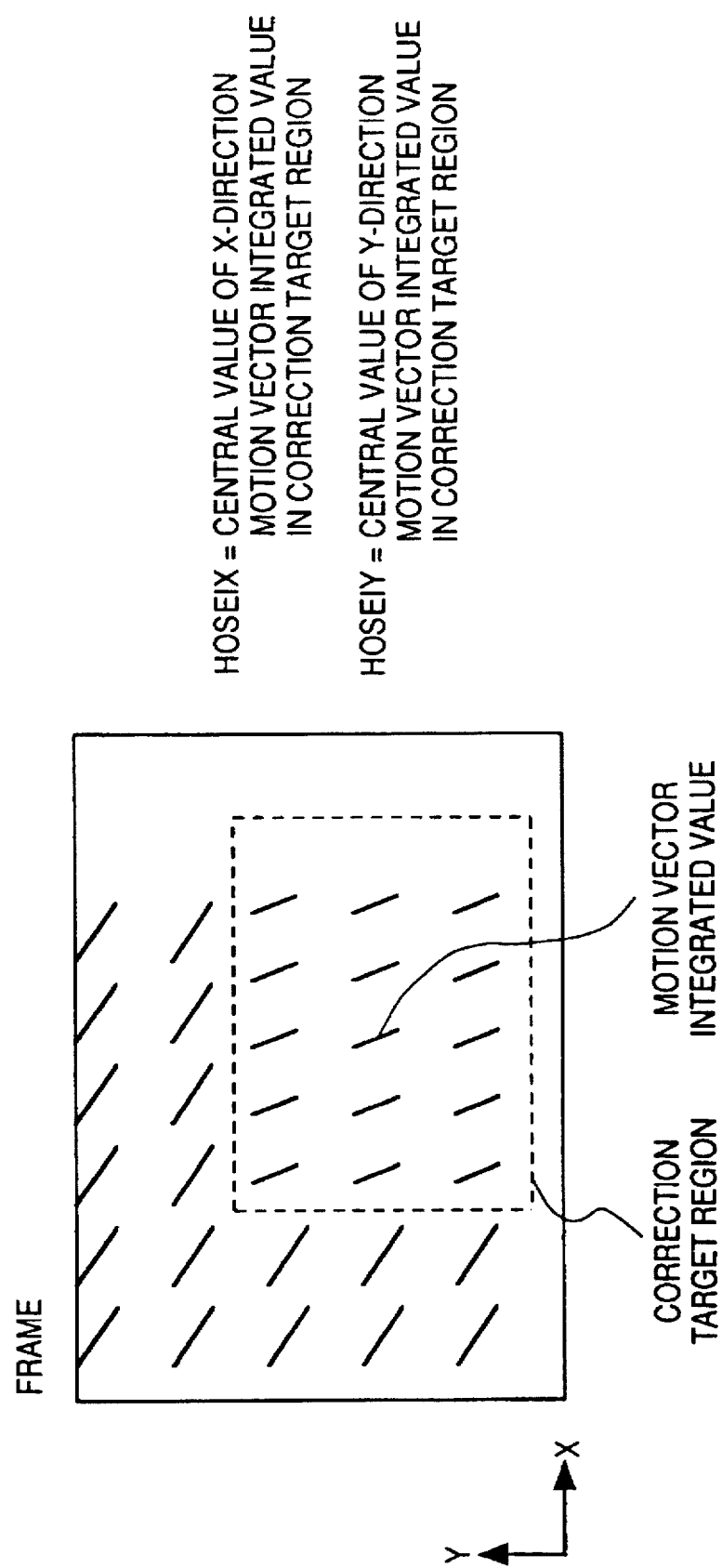
FIG. 24 is an explanatory view of a correction value calculation in an image processing apparatus according to the eighth embodiment of the present invention.

FIG. 24 is an explanatory view of correction value calculations in an image processing apparatus according to this embodiment. In the above-mentioned seventh embodiment (FIG. 5 in the first embodiment), motion vectors in the correction target region are averaged. However, in this embodiment, as shown in FIG. 24, medians (central values) of motion vector integrated values in the correction target region are calculated.

Other arrangements and effects of this embodiment are the same as those in the seventh embodiment.

(Ninth Embodiment)

Figure 25:
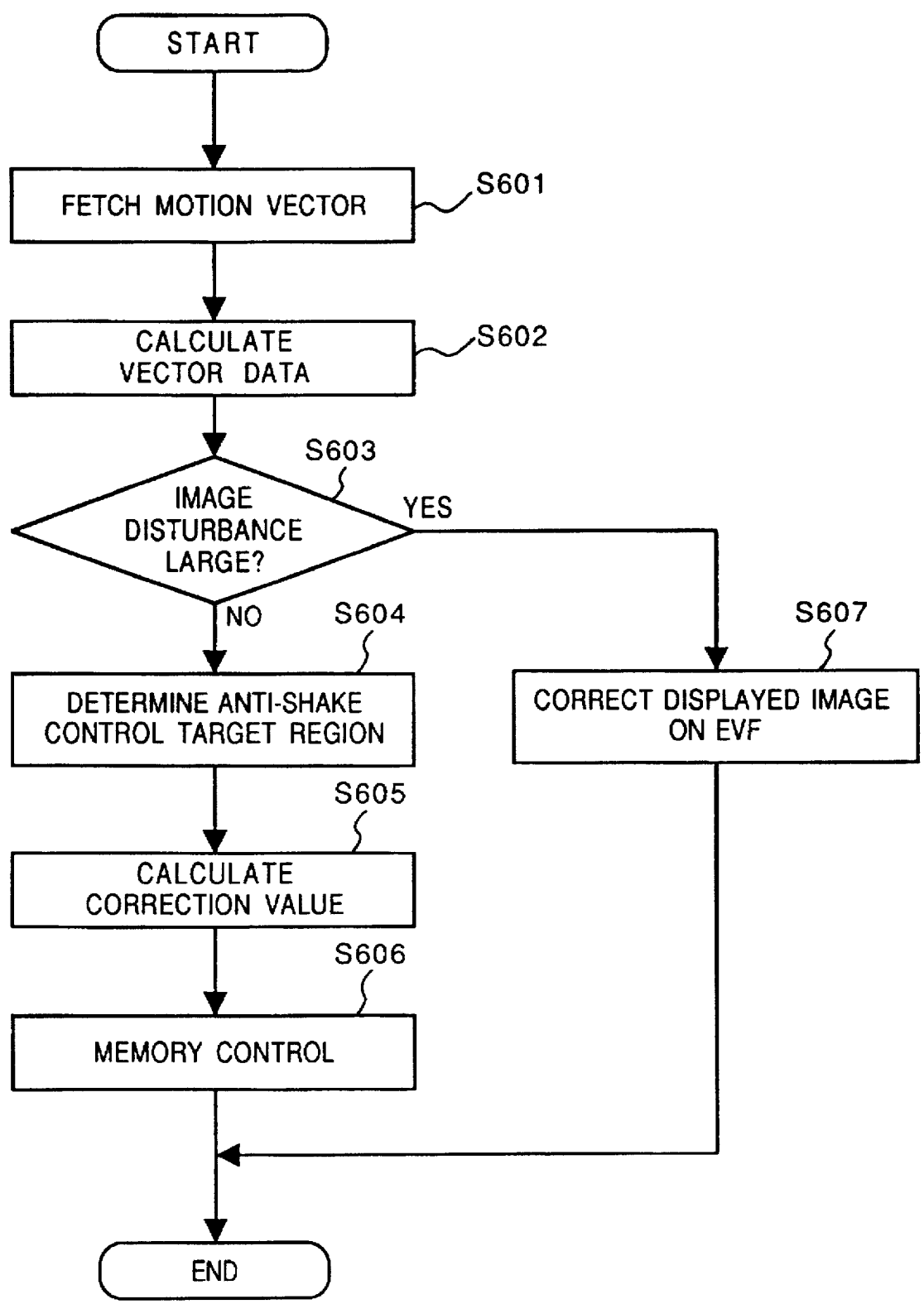
FIG. 25 is a flow chart showing the operation of a logic controller in an image processing apparatus according to the ninth embodiment of the present invention.
Figure 26:
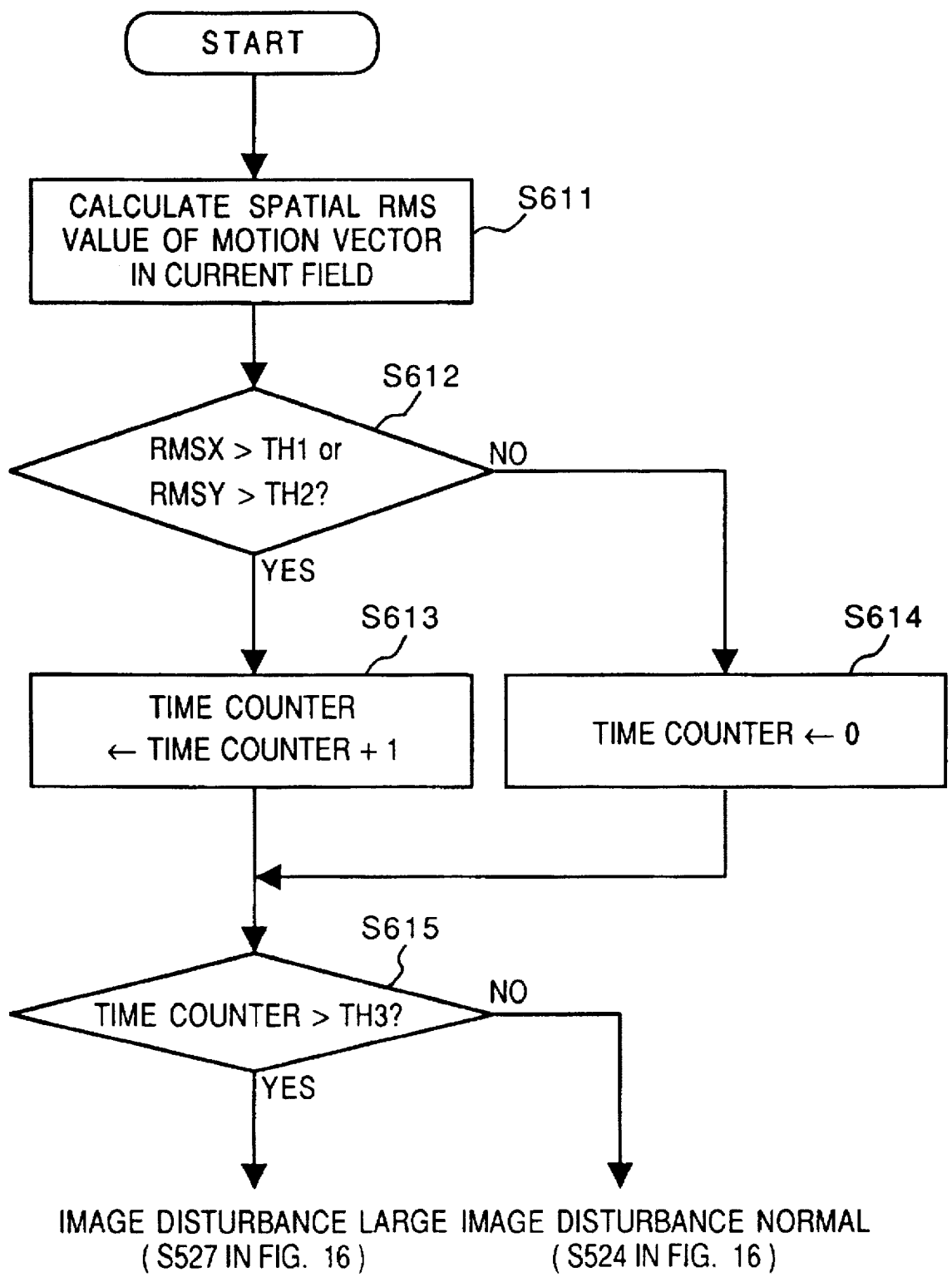
FIG. 26 is a flow chart showing the image blur discrimination operation in the image processing apparatus shown in FIG. 25.

The ninth embodiment of the present invention will be described below with reference to FIGS. 25 and 26. FIG. 25 is a flow chart showing the operation of an image processing apparatus according to this embodiment, and FIG. 26 is a flow chart showing the image blur discrimination operation of the apparatus of this embodiment.

Since the image processing apparatus according to this embodiment has basically the same arrangement as that of the fifth embodiment shown in FIG. 15, the following description will be made with reference to FIG. 15. In particular, the logic controller of this embodiment has the following function. That is, the logic controller detects a disturbance of motion vectors from those detected by the motion vector detection circuit 34. When the disturbance has exceeded a predetermined reference amount, the logic controller operates the zoom driving circuit 231 to move the zoom lens group 201, thereby optically changing the blur correction range. At the same time, the logic controller controls the field angle of an image displayed on the electric viewfinder (EVF) to an optimal value in synchronism with the optical change. Since other arrangements of this embodiment are the same as those in the fifth embodiment, a detailed description thereof will be omitted.

The operation of the image processing apparatus of this embodiment will be described below with reference to the flow chart in FIG. 25.

In step S601, the logic controller 220 fetches signals corresponding to horizontal and vertical motion vector components from the motion vector detection circuit 34 in units of fields, and thereafter, the flow advances to step S602. In step S602, the logic controller 220 integrates the motion vectors at a predetermined frame position to calculate a deviation from the reference position on the frame, calculates an image blur on the basis of the calculated deviation, and calculates an image blur correction signal for correcting the calculated image blur. In the deviation calculations, the reliability of individual motion vectors is also evaluated, and is reflected in the integral processing, thus allowing more accurate deviation calculations.

The flow then advances to step S603 and the logic controller 220 checks, based on the motion vectors fetched in step S601, whether or not an image disturbance based on the disturbance of the motion vectors occurs beyond the reference amount due to the presence of an object which moves restlessly in the frame, and image blur correction is disabled in the current state. If YES in step S603, the flow advances to step S607 to execute widening processing of the correction region. However, if NO in step S603, the flow advances to step S604, and the logic controller 220 determines a correction target region on the basis of the motion vectors fetched in step S601 and the spatial distribution or time variation of the integrated values of the motion vectors calculated in step S602. Thereafter, the flow advances to step S605.

20

In step S605, the logic controller 220 extracts motion vector integrated values in the correction target region determined in step S604 to calculate a final image blur correction value. The flow then advances to step S606. In step S606, the logic controller 220 converts the image blur correction values calculated in step S605 into the read address of the field memory 38 (see FIG. 15), issues a command for actually controlling the memory, and shifts the read-out range of an image from the memory on the basis of the image blur correction values, thereby canceling the motion of the image. In addition, a command for giving a desired enlargement or reduction magnification corresponding to the size of the read-out range from the memory to the electronic zoom circuit 40 (see FIG. 15) is issued, and the field image of a final output image is restored to a normal field angle.

The image blur discrimination operation in the image processing apparatus of this embodiment will be described below with reference to the flow chart in FIG. 26.

In step S611, spatial disturbance strengths RMSX and RMSY in the X- and Y directions are calculated using the following equations (4) on the basis of motion vectors between an image one field before and an image of the current field, which vectors are fetched in step S601 in FIG. 25:

$$RMSX = \Sigma \{MVXAVE - MVX(i, j)\}^2/(i \times j - 1)$$

$$RMSY = \Sigma \{MVYAVE - MVY(i, j)\}^2/(i \times j - 1) \qquad (4)$$

where MVXAVE and MVYAVE are the spatial average values of motion vectors in the X- and Y-directions, MVX(i, j) and MVY(i, j) are the motion vectors in the X- and Y-directions, and i and j are the numbers of motion vectors in the x- and Y-directions.

Referring back to the flow chart in FIG. 26, in step S612, it is checked in step S612 if at least one of the disturbance strengths RMSX and RMSY in the X- and Y-directions calculated in step S611 has exceeded a predetermined threshold value TH1 or TH2. If YES in step S612, the flow advances to step S613 to increment a time counter for counting how many times the blur correction value has exceeded the predetermined threshold value. However, if NO in step S612, the flow advances to step S614 to reset the time counter.

After execution of step S613 or S614, the flow advances to step S615 to check if the count value of the time counter has exceeded a predetermined count. If YES in step S615, it is finally determined that many objects which move restlessly are present, the disturbance of the motion vectors is large, and it is impossible to perform image blur correction.

As described above, if it is determined in step S615 that the count value of the time counter has exceeded the predetermined count, the same widening processing of the correction region as in the fifth embodiment, which has been described above with reference to FIG. 18, is executed to change the actual field angle by an amount inconspicuous to a photographer.

When the image blur correction value is calculated based on a plurality of motion vectors like in this embodiment, if motion vectors do not have a uniform direction, the accuracy of the correction value is considerably impaired. Such an image state occurs when an object moves restlessly in the frame, as described above, or when an object having a shape for which motion vectors are not easily obtained is present. However, when such blur correction impossible state occurs, this state is accurately identified and detected on the basis of the spatial disturbance strengths of the motion vectors, and processing for widening the correction region by changing the actual field angle by an amount inconspicuous to a photographer is executed (see FIG. 20). For this reason, image blur correction can be performed while an object with motion vectors having a small disturbance is located in the frame.

As described above, according to the ninth embodiment, when motion vectors are disturbed beyond the reference amount, and image blur correction becomes disabled, such a state is accurately detected, and in this state, the correction region is widened without changing the apparent field angle on the EVF. Thus, an image with motion vectors having a small disturbance can be displayed in the frame to perform image blur correction.

In the ninth embodiment, the disturbance strengths of motion vectors are independently calculated in the X-and Y-directions, and possibility of correction is discriminated. However, the strengths in the X- and Y-directions may be discriminated simultaneously using the following equation (5):

$$RMSXY = \Sigma\{(MVXAVE - MVX(i, j))^2 + (MVYAVE - MVY(i, j))^2\}^{1/2}/(i \times j - 1) \quad (5)$$

where "MVXAVE" and "MVYAVE" are the spatial average values of motion vectors in the X- and Y-directions, MVX(i, j) and MVY(i, j) are the motion vectors in the X-and Y-directions, and i and j are the numbers of motion vectors in the X- and Y-directions.

As described above, according to the image processing apparatus of each of the fifth to ninth embodiments, motion vectors between images are detected from an image signal of an object, and an image blur state is detected on the basis of motion information such as the absolute values, spatial distribution, time distribution, or the like of a plurality of motion vectors. When the image blur has exceeded a detection range, this state is accurately detected. Upon detection of this state, the focal length of an optical system including the focusing lens group and the zoom lens group is controlled to optically change the blur correction range. In synchronism with the control of the blur correction range, the field angle of an image displayed on the viewfinder is controlled to an optimal value. For this reason, even when an image blur exceeding the detection range occurs, the correction region is widened without changing the apparent field angle on the viewfinder, and image blur correction in real time can be attained without giving a disrupted feeling to a photographer.

Also, motion vectors between images are detected from an image signal of an object, and the detected motion vectors are added to each other to calculate the absolute deviation of the current image from the reference point. Occurrence of an image blur exceeding a correction limit region is accurately detected by detecting if the absolute deviation has successively exceeded a predetermined reference correction value a reference number of times. Upon detection of this state, the focal length of an optical system including the focusing lens group and the zoom lens group is controlled to optically change the blur correction range. In synchronism with the control of the blur correction range, the field angle of an image displayed on the viewfinder is controlled to an optimal value. For this reason, even when an image blur exceeding the correction limit region occurs, the correction region is widened without changing the apparent field angle on the viewfinder, and image blur correction in real time can be attained without giving a disrupted feeling to a photographer.

Furthermore, motion vectors between images are detected from an image signal of an object, and a disturbance of the motion vectors is detected. When the disturbance of the detected motion vectors has exceeded a predetermined reference value, and it is determined that image blur correction is disabled, this state is accurately detected. In this state, the focal length of an optical system including the focusing lens group and the zoom lens group is controlled to optically change the blur correction range. In synchronism with the control of the blur correction range, the field angle of an image displayed on the viewfinder is controlled to an optimal value. For this reason, even when the disturbance of the motion vectors is large and the motion vectors cannot be detected, the correction region is widened without changing the apparent field angle on the viewfinder, so that an image with motion vectors having a small disturbance is displayed on the frame, thus allowing image blur correction in real time.

(10th Embodiment)

Since the image processing apparatus of the 10th embodiment has basically the same arrangement as that of the fifth embodiment shown in FIG. 15, the following description will be made with reference to FIG. 15. Since the overall arrangement and schematic operation of this embodiment have already been described in the fifth embodiment, a detailed description thereof will be omitted.

Figure 27:
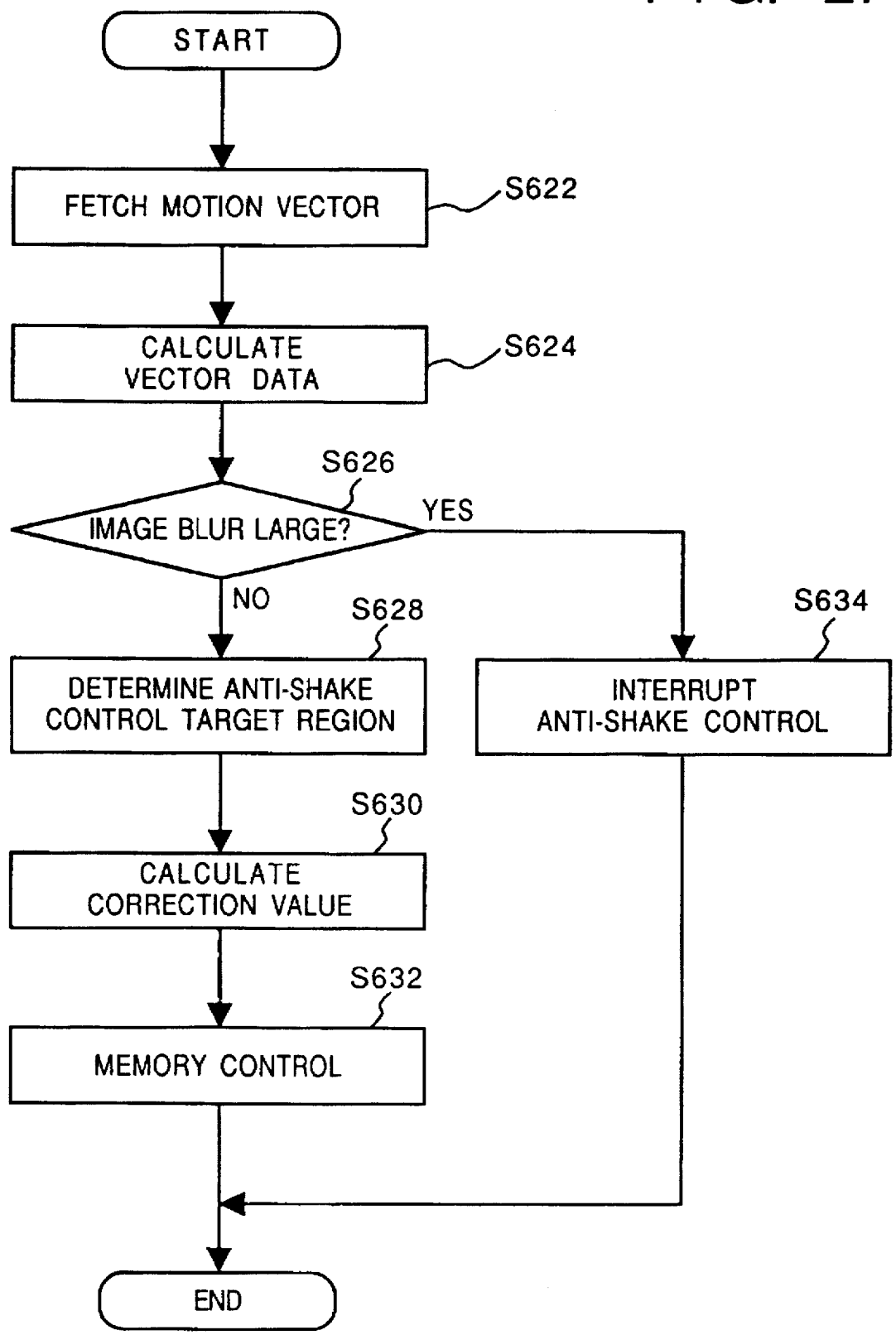
FIG. 27 is a flow chart showing the operation of a logic controller according to the 10th embodiment of the present invention.

The operation of the logic controller 220 of this embodiment will be described below with reference to the flow chart in FIG. 27. FIG. 27 is a flow chart showing the operation of the logic controller 220 of this embodiment.

In step S622 in FIG. 27, the logic controller 220 fetches signals corresponding to horizontal and vertical motion vector components from the motion vector detection circuit 34 in units of fields, and thereafter, the flow advances to step S624. In step S624, the logic controller 220 integrates motion vectors at a predetermined frame position to calculate a deviation from the reference position on the frame, and calculates an image blur correction signal on the basis of the calculated deviation. In the deviation calculations, the reliability of individual motion vectors is also evaluated, and is reflected in the integral processing, thus allowing more accurate deviation calculations.

In step S626, the logic controller 220 checks based on the motion vectors fetched in step S622 if the current image blur has exceeded the detection range of the motion vector detection circuit 34. If YES in step S626, it is determined that image blur correction is disabled, and the flow advances to step S624 to interrupt the image blur correction. However, if NO in step S626, the flow advances to step S628 and the logic controller 220 determines a region including a blur, i.e., a correction target region on the basis of the motion vectors fetched in step S622 and the spatial distribution or time variation of the integrated values of the motion vectors calculated in step S624. Thereafter, the flow advances to step S630.

In step S630, the logic controller 220 extracts motion vector integrated values in the correction target region determined in step S628 to calculate a final image blur correction value. It is also checked if the calculated image blur correction value has exceeded a correctable region. If it is determined that the calculated image blur correction value has exceeded the correctable region, since blur correction cannot be normally performed, required processing for, e.g., stopping the correction operation or prolonging the response time of the correction operation is executed. The flow advances from step S630 to step S632. In step S632, the logic controller 220 converts the image blur correction values calculated in step S630 into the read address of the field memory 38, issues a command for actually controlling the memory, and shifts the read-out range of an image from the memory on the basis of the image blur correction values, thereby canceling the motion of the image. In addition, a command for giving a desired enlargement or reduction magnification corresponding to the size of the read-out range from the memory to the electronic zoom circuit 40 is issued, and the field image of a final output image is restored to a normal field angle.

With this control, since the read-out range is shifted on the memory, the field angle corresponding to the read-out range, which is set to be relatively small as compared to the entire frame, can be modified to a normal field angle, and the frame can be electronically widened.

The image blur discrimination operation and the correction interruption operation of this embodiment will be described below with reference to FIGS. 28 and 29.

Figure 28:
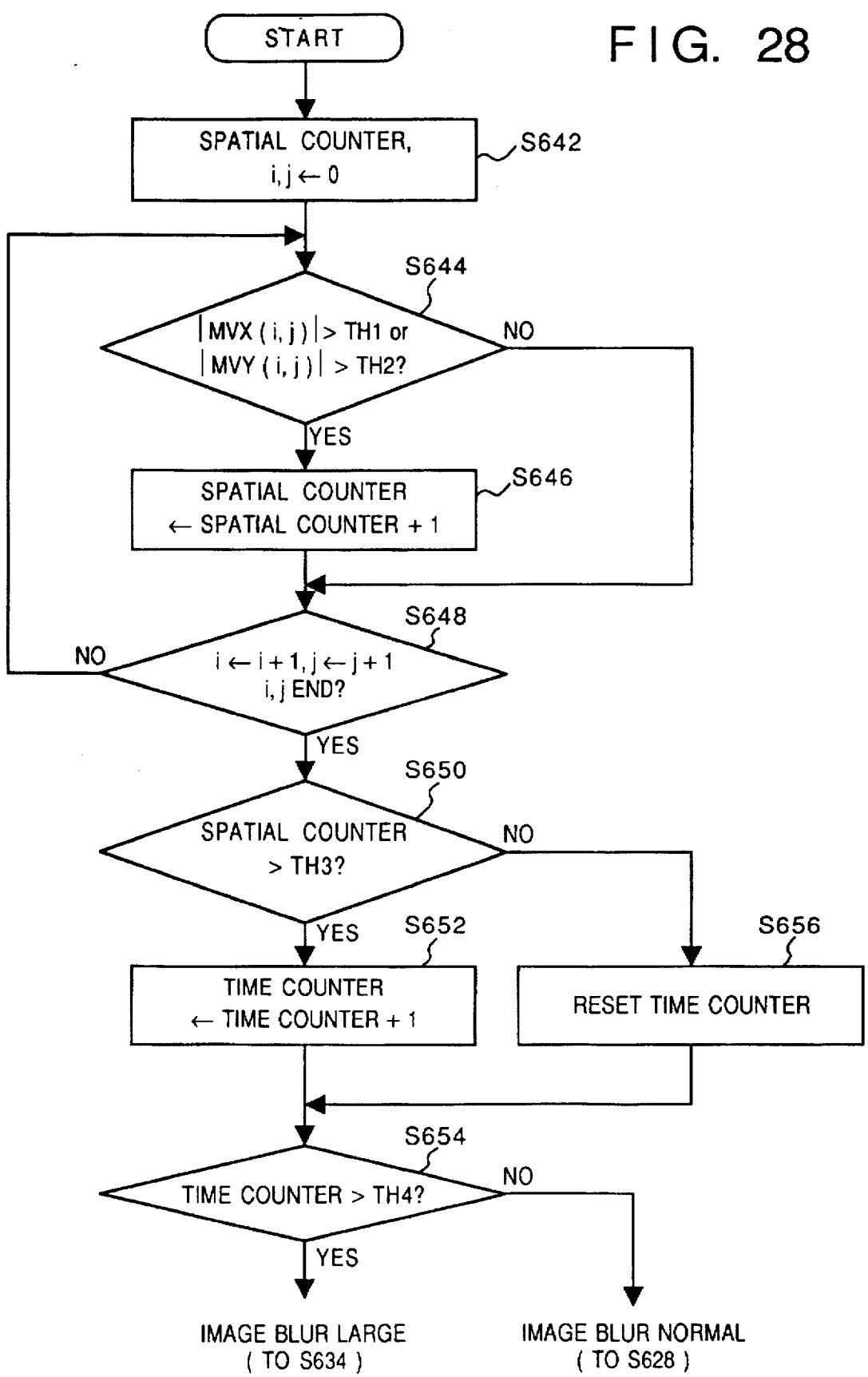
FIG. 28 is a flow chart showing the image blur discrimination operation of the 10th embodiment.
Figure 29:
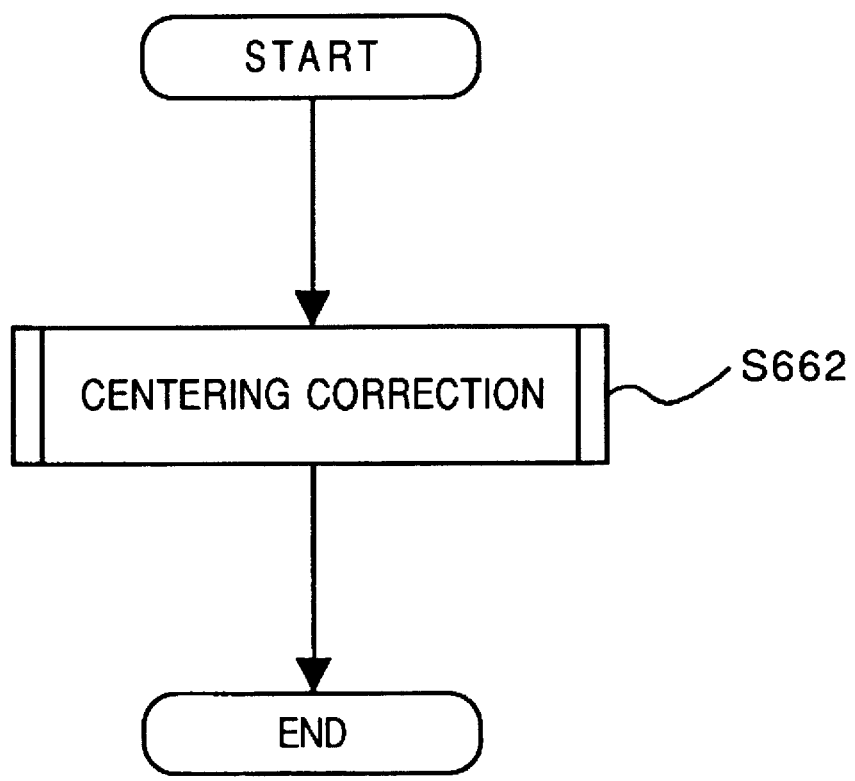
FIG. 29 is a flow chart showing the correction interruption operation of the 10th embodiment.

FIG. 28 is a flow chart showing the image blur discrimination operation of this embodiment, and FIG. 29 is a flow chart showing the correction interruption operation of this embodiment.

In step S642 in FIG. 28, the logic controller 220 resets the count value of a spatial counter for counting, among a plurality of positions in the frame, the number of positions in the frame at which the detected motion vectors have exceeded a predetermined amount, and a detection frame position (i, j). Thereafter, the flow advances to step S644 to check if an X-direction motion vector MVX(i, j) and a Y-direction motion vector MVY(i, j) at a position (i, j) have respectively exceeded predetermined threshold values TH1 and Th2. These threshold values TH1 and TH2 are set to be maximum motion amounts which can be detected by the motion vector detection circuit 34. If it is determined in step S644 that at least one of the X-direction motion vector MVX(i, j) and the Y-direction motion vector MVY(i, j) at the position (i, j) has exceeded the corresponding threshold value TH1 or TH2, the flow advances to step S646 to increment the spatial counter. Thereafter, the flow advances to step S648. On the other hand, if it is determined in step S644 that neither the X-direction motion vector MVX(i, j) nor the Y-direction motion vector MVY(i, j) at the position (i, j) exceed the threshold values TH1 and TH2, the flow directly jumps to step S648.

In step S648, it is checked if processing of all the motion vectors in the frame is completed. If NO in step S648, the flow returns to step S644 to repeat the processing in steps S644 and S646. However, if YES in step S648, the flow advances to step S650. In step S650, it is checked if the number of positions where the motion vectors have exceeded the threshold value in the frame has exceeded a predetermined value TH3. If YES in step S650, the flow advances to step S652 to increment the time counter; otherwise, the flow advances to step S656 to reset the time counter.

After execution of step S652 or S656, the flow advances to step S654 to check if the count value of the time counter has exceeded a predetermined value TH4. If YES in step S654, it is finally determined that the image blur is too large to perform correction, and the image blur correction is interrupted. However, if NO in step S654, it is determined that the image blur is in a normal range, and the image blur correction is continued.

If it is determined in step S654 that the image blur correction is disabled, the flow advances to step S662 in FIG. 29 as the routine in step S634. In step S662, the logic controller 220 interrupts the normal image blur correction operation, and controls the read address of the field memory 38 to perform centering correction for moving a corrected image P in the entire frame PT to the center 0 of the frame over a predetermined period of time, as shown in FIG. 7 described in the first embodiment.

In general, when the image blur amount is large, the spatial distribution of the detected motion vectors does not always increase as the image blur amount increases. As shown in FIG. 19, the detection motion vectors are largely offset, and a nonuniform spatial distribution is often detected. In contrast to this, in this embodiment, the spatial or time distribution of the motion vectors is adequately evaluated, and it can be accurately identified that image blur correction is difficult to achieve. In this embodiment, when it is determined that an image blur has exceeded a predetermined value, the image blur correction is not inadvertently continued, and is interrupted. Then, the centering correction is performed to correct the corrected image position, and thereafter, normal image blur correction is performed.

As described above, according to the 10th embodiment, upon image blur correction, occurrence of a blur which cannot be corrected is accurately detected. When a blur which cannot be corrected has occurred, the normal image blur correction operation is interrupted, and a corrected image is moved to the center of the frame, thus minimizing the disturbance of the corrected image without giving a disrupted feeling to a photographer.

(11th Embodiment)

Figure 31:
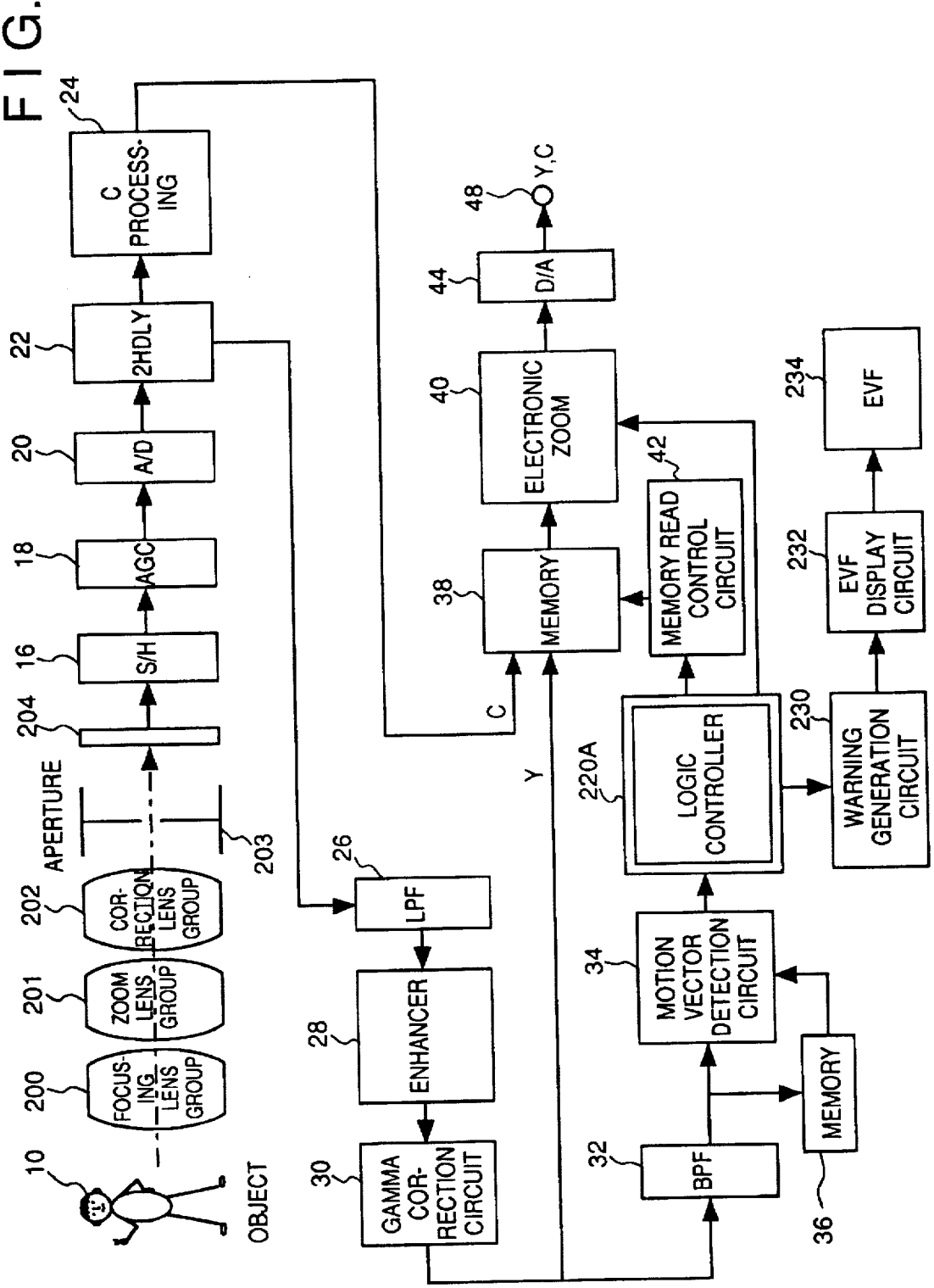
FIG. 31 is a block diagram showing the arrangement according to the 11th embodiment of the present invention.

The 11th embodiment of the present invention will be described below with reference to FIGS. 31 and 32. FIG. 31 is a block diagram showing the arrangement of the 11th embodiment, and FIG. 32 is a flow chart showing the operation of a logic controller of the 11th embodiment.

As shown in FIG. 31, in this embodiment, a warning generation circuit 230 for generating a warning message indicating that an image blur cannot be corrected to an operator is connected to a logic controller 220A in the 10th embodiment which has been described above with reference to FIG. 15. An EVF display circuit 232 for controlling the display operation of a warning message on an electric viewfinder (EVF) is connected to the warning generation circuit 230. The EVF display circuit 232 is connected to an EVF 234. The logic controller 220A has a function of displaying a warning message indicating that an image blur cannot be corrected for an operator when it is determined that the image blur correction is disabled. Since other arrangements of this embodiment are the same as those in the 10th embodiment described above, a detailed description thereof will be omitted.

Figure 32:
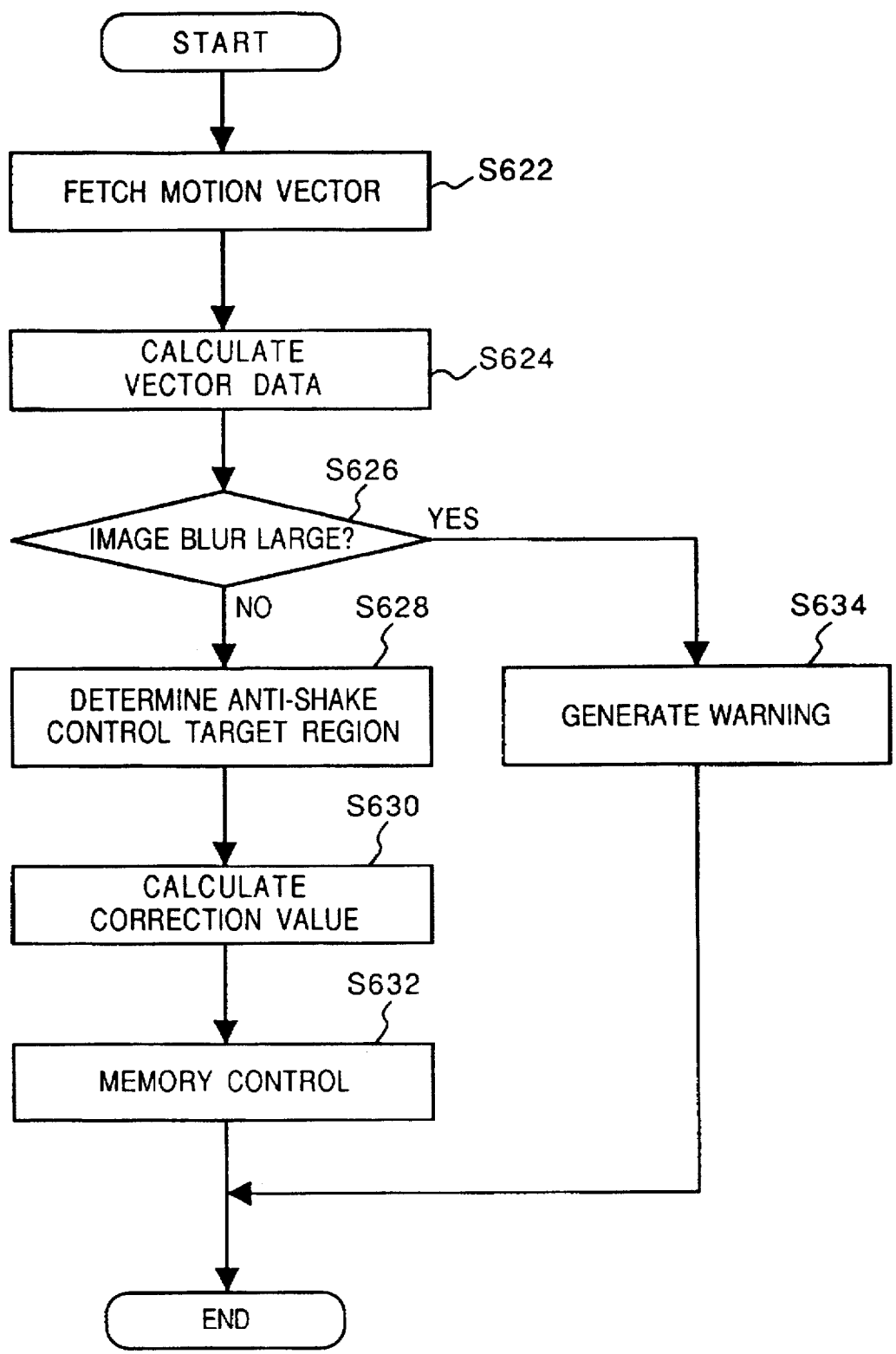
FIG. 32 is a flow chart showing the operation of a logic controller of the 11th embodiment.

As shown in FIG. 32, in the flow chart of this embodiment, substantially the same processing operations as those in the steps in the flow chart of the 10th embodiment described above are executed, except for step S634A. More specifically, in this embodiment, when the logic controller 220A determines in step S626 that image blur correction is disabled, the flow advances to step S634A, and the warning generation circuit 230 outputs a warning signal. Based on this warning signal, a warning message AR "camera shake!" (FIG. 11) is displayed on the EVF 234 under the control of the EVF display circuit 232. Since other operations of this embodiment in the flow chart in FIG. 32 are the same as those in the 10th embodiment described above, and the image blur discrimination operation of this embodiment is the same as that of the 10th embodiment which has already been described above with reference to FIG. 28, a detailed description thereof will be omitted.

As described above, according to the 11th embodiment, upon image blur correction, occurrence of a blur which cannot be corrected is accurately detected. When a blur which cannot be corrected has occurred, a warning message indicating that an image blur cannot be corrected is displayed on the EVF 234 for an operator. For this reason, the disturbance of a corrected image can be minimized, and a disturbed image for which an image blur correction cannot be performed can be prevented from being photographed.

Figure 30:
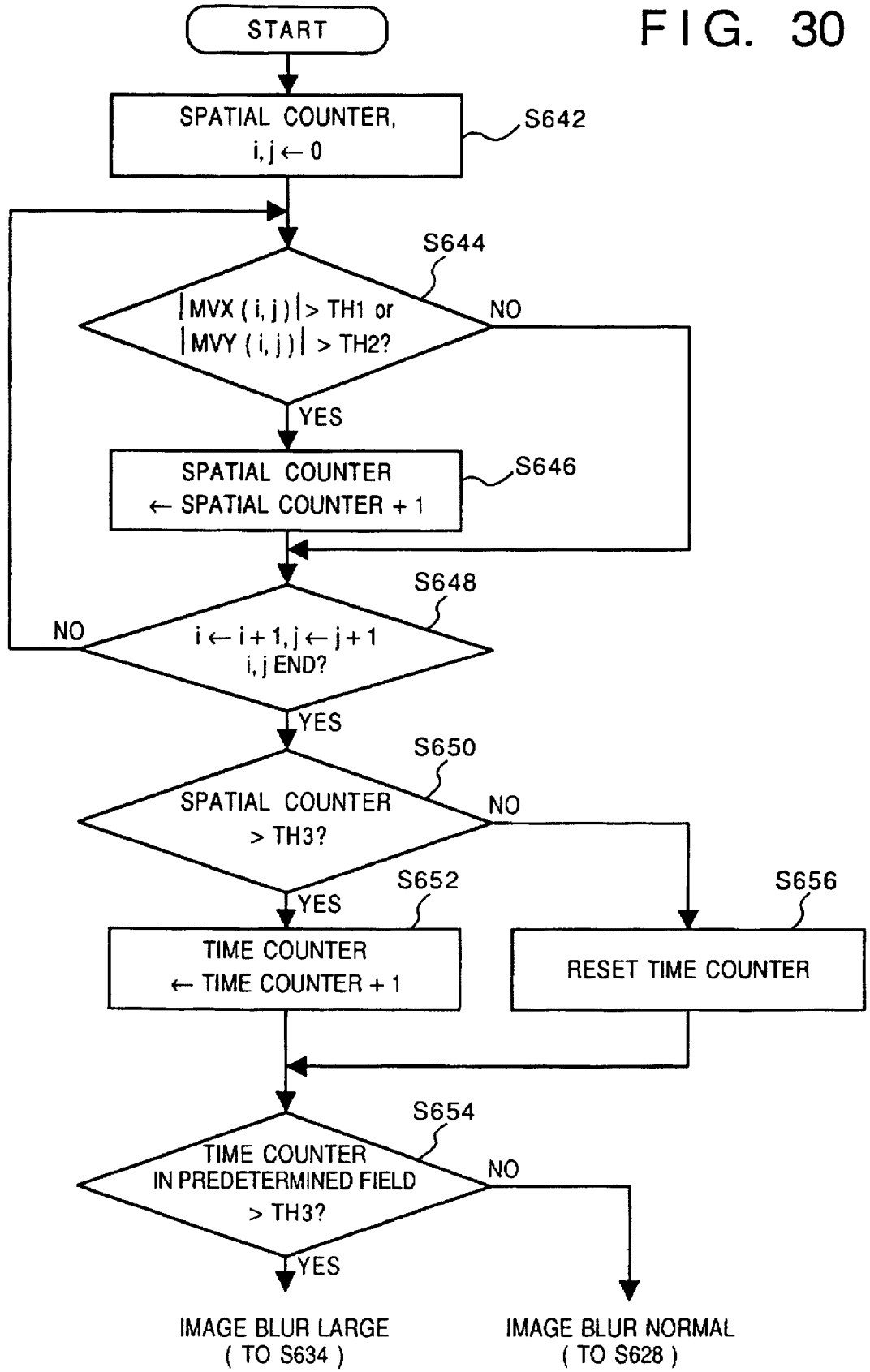
FIG. 30 is a flow chart showing another image blur discrimination operation of the 10th embodiment.

Note that FIG. 30 is a flow chart showing another example of the image blur discrimination operation of the 10th embodiment, and this flow chart can also be applied to the 11th embodiment. This flow chart is substantially the same as that shown in FIG. 28, except for step S654M. More specifically, in FIG. 28, when the count value of the time counter has exceeded the predetermined value TH4, it is finally determined that image blur correction is disabled. However, in this embodiment, when it is determined in step S654M that the count value of the time counter in a predetermined past field has exceeded the threshold value TH4, it is finally determined that image blur correction is disabled. In the 11th embodiment, a warning message indicating that image blur correction is disabled is displayed on the EVF 234. However, the present invention is not limited to the 11th embodiment. For example, a warning message indicating that image blur correction is disabled may be realized by a voice or another warning tone.

As described above, according to the 10th embodiment, motion vectors between images are detected by correlation calculations between time-serially continuous images, and an image blur state is detected on the basis of the absolute values, spatial distribution, and time distribution of a plurality of detected motion vectors. When the image blur amount has exceeded a predetermined amount, blur correction is interrupted. For this reason, the disturbance of a corrected image can be minimized without giving a disrupted feeling to a photographer.

According to the 11th embodiment, motion vectors between images are detected by correlation calculations between time-serially continuous images, and an image blur state is detected on the basis of the absolute values, spatial distribution, and time distribution of a plurality of detected motion vectors. When the image blur amount has exceeded a predetermined amount, a warning is generated, thus obtaining the same effect as in the 10th embodiment.

The present invention is not limited to the above embodiments and various changes and modifications can be made within the spirit and scope of the present invention. Therefore, to apprise the public of the scope of the present invention the following claims are made.

What is claimed is:

1. An image processing apparatus for detecting motion vectors from an image signal and correcting an image blur in real time, comprising:
   detection means for detecting motion vectors between images by executing a correlation calculation between time-serially continuous images;
   calculation means for calculating an absolute deviation of an image from a reference point on the basis of the motion vectors detected by said detection means;
   comparison means for comparing the absolute deviation with a predetermined correction amount; and
   interruption means for, when a state wherein the absolute deviation is larger than the predetermined correction mount continues for a predetermined period of time or longer, determining that the image blur has exceeded a correctable range, and interrupting correction of the image blur.

2. The apparatus according to claim 1, further comprising storage means for storing the image signal, and wherein a storage position of a correction target frame in said storage means is moved to a position suitable for correction during interruption of the correction.

3. The apparatus according to claim 2, wherein said position where said motion vector is canceled corresponds to the center of a storage area of said storage means and said correction target frame is moved to said center within a predetermined time period.

4. The apparatus according to claim 2, further comprising image blur correcting means for correcting said blur on the basis of said motion vector detected by said detection means and wherein said image blur correcting means corrects the image blur by moving the storage position of the correction target frame stored in said storage means to a position where said motion vector is canceled.

5. The apparatus according to claim 4, wherein said image blur correcting means has an electronic zoom means for magnifying the image information read out from said storage means.

6. The apparatus according to claim 1, wherein said interruption means detects said absolute deviation at a predetermined time interval and interrupts the correction of the image blur when an amount of the absolute deviation is larger than the predetermined correction amount, for a predetermined continuous number of times.

7. An image processing apparatus for detecting motion vectors from an image signal and correcting an image blur in real time, comprising:
   detection means for detecting motion vectors between images by executing a correlation calculation between time-serially continuous images;
   calculation mans for calculating an absolute deviation of an image from a reference point on the basis of the motion vectors detected by said detection means;
   comparison means for comparing the absolute deviation with a predetermined correction amount; and
   warning means for, when a state wherein the absolute deviation is larger than the predetermined correction mount continues for a predetermined period of time or longer, determining that the image blur has exceeded a correctable range, and generating a warning to a photographer and inhibiting the operation of correcting the image blur.

8. The apparatus according to claim 3, further comprising an image blur correcting means for correcting said blur on the basis of said motion vector detected by said detection means and wherein said image blur correcting means corrects the image blur by moving the storage position of the correction target frame stored in said storage means to a position where said motion vector is canceled.

9. The apparatus according to claim 8, wherein said image blur correcting means has an electronic zoom means for magnifying the image information read out from said storage means.

10. The apparatus according to claim 7, wherein said position where said motion vector is canceled corresponds to the center of a storage area of said storage means and said correction target frame is moved to said center within a predetermined time period.

11. The apparatus according to claim 10, wherein said image blur correcting means has an electronic zoom means for magnifying the image information read out from said storage means.

12. An image processing apparatus for detecting motion vectors from an image signal and correcting an image blur in real time, comprising:
   motion vector detection means for detecting motion vectors between images by executing a correlation calculation between time-serially continuous images;

disturbance detection means for detecting a disturbance of the motion vectors detected by said motion vector detection means; and interruption means for, when the disturbance of the motion vectors is larger than a predetermined amount, determining that the motion vectors cannot be accurately detected, and interrupting correction of the image blur.

13. The apparatus according to claim 12, further comprising storage means for storing the image signal, and wherein a storage position of a correction target frame in said storage means is moved to a position suitable for correction during interruption of the correction.

14. The apparatus according to claim 13, further comprising image blur correcting means for correcting said blur on the basis of the motion vector detected by said detection means and wherein said image blur correcting means corrects the image blur by moving the storage position of the correction target frame stored in said storage means to a position where said motion vector is canceled.

15. The apparatus according to claim 12, wherein said position where said motion vector is canceled corresponds to the center of a storage area of said storage means and said correction target frame is moved to said center with a predetermined time period.

16. The apparatus according to claim 12, wherein said disturbance detection means detects an area which has a moving object from a spatial distribution and time fluctuation of said motion vectors.

17. The apparatus according to claim 16, wherein said interruption means controls the image blur correcting operation on the basis of the motion vectors included in the area which has a moving object.

18. The apparatus according to claim 17, wherein said disturbance detection means detects random motions of objects, a uniformly repeated pattern, a low contrast state.

19. The apparatus according to claim 18, wherein said image blur correcting means has an electronic zoom means for magnifying the image information read out from said storage means.

20. An image processing apparatus for detecting motion vectors from an image signal and correcting an image blur in real time, comprising:

motion vector detection means for detecting motion vectors between images by executing a correlation calculation between time-serially continuous images;

disturbance detection means for detecting a disturbance of the motion vectors detected by said motion vector detection means; and warning means for, when the disturbance of the motion vectors is larger than a predetermined amount, determining that the motion vectors cannot be accurately detected, and generating a warning to a photographer.

21. The apparatus according to claim 20, wherein said disturbance detection means detects an area which has a moving object from a spatial distribution and time fluctuation of said motion vectors.

22. The apparatus according to claim 21, further comprising means for controlling the image blur correcting operation on the basis of the motion vectors included in the area which has a moving object.

23. The apparatus according to claim 21, wherein said disturbance detection means detects random motions of objects, a uniformly repeated pattern, a low contrast state.

24. An image processing apparatus for detecting motion vectors between images from an image signal obtained by converting an optical signal from an object, which signal is obtained via an optical system including a focusing lens group and a zoom lens group, into an electrical signal, and correcting a blur of the image in real time, comprising:

vector detection means for detecting motion vectors between images by executing a correlation calculation between time-serially continuous images;

blur detection means for detecting a blur state of the image on the basis of motion vectors detected by said vector detection means;

blur correction range control means for, when said blur detection means detects that the image is blurred beyond a predetermined value, optically changing a blur correction range by controlling a focal length of the optical system; and field angle control means for controlling a field angle of an image displayed on a monitor in synchronism with the control of said blur correction range control means.

25. The apparatus according to claim 24, wherein said focusing lens group is arranged behind said zoom lens group along an optical axis of said optical system.

26. The apparatus according to claim 24, said field angle control means shifts the field angle of the optical system to a wide angle side when said blur exceeds a predetermined level.

27. The apparatus according to claim 26, wherein said field angle control means shifts the zoom lens group to a wide angle side when said blur exceeds a predetermined level.

28. The apparatus according to claim 27, further comprising field angle correcting means for correcting the field angle which is shifted to the wide angle side by shifting the zoom lens group, by an electronic zoom.

29. An image processing apparatus for detecting motion vectors between images from an image signal obtained by converting an optical signal from an object, which signal is obtained via an optical system including a focusing lens group and a zoom lens group, into an electrical signal, and correcting a blur of the image in real time, comprising:

vector detection means for detecting motion vectors between images by executing a correlation calculation between time-serially continuous images;

calculation means for calculating an absolute deviation of an image from a reference point by adding the motion vectors detected by said vector detection means;

blur correction range control means for, when the number of times of continuous excess of the absolute deviation calculated by said calculation means over a predetermined reference correction amount has exceeded a predetermined reference count, optically changing a blur correction range by controlling a focal length of the optical system; and field angle control means for controlling a field angle of an image displayed on a monitor in synchronism with the control of said blur correction range control means.

30. The apparatus according to claim 29, said field angle control means shifts the field angle of the optical system to a wide angle side when said blur exceeds a predetermined level.

31. The apparatus according to claim 30, said field angle control means shifts the zoom lens group to a wide angle side when said blur exceeds a predetermined level.

32. The apparatus according to claim 31 further comprising field angle correcting means for correcting the field angle which is shifted to the wide angle side by shifting the zoom lens group, by an electronic zoom.

33. An image processing apparatus for detecting motion vectors between images from an image signal obtained by converting an optical signal from an object, which signal is obtained via an optical system including a focusing lens group and a zoom lens group, into an electrical signal, and correcting a blur of the image in real time, comprising:

vector detection means for detecting vectors between images by executing a correlation calculation between time-serially continuous images;

disturbance detection means for detecting a disturbance of the vectors detected by said vector detection means;

blur correction range control means for, when the disturbance of vectors detected by said disturbance detection means has exceeded a predetermined reference amount, optically changing a blur correction range by controlling a focal length of the optical system; and field angle control means for controlling a field angle of an image displayed on a monitor in synchronism with the control of said blur correction range control means.

34. The apparatus according to claim 33, wherein said field angle control means shifts the field angle of the optical system to a wide angle side when said blur exceeds a predetermined level.

35. The apparatus according to claim 34, wherein said field angle control means shifts the zoom lens group to a wide angle side when said blur exceeds a predetermined level.

36. The apparatus according to claim 35, further comprising field angle correcting means for correcting the field angle which is shifted to the wide angle side by shifting the zoom lens group, by an electronic zoom.

37. An image processing apparatus for detecting motion vectors from an image signal and correcting an image blur in real time, comprising:

vector detection means for detecting motion vectors between images by executing a correlation calculation between time-serially continuous images;

blur detection means for detecting a blur state of the image on the basis of a plurality of motion vectors detected by said vector detection means; and interruption means for, when the blur amount of the image detected by said blur detection means has exceeded a predetermined value during a predetermined period of time, interrupting correction of the blur.

38. The apparatus according to claim 37, wherein said blur detection means detects an area which has a moving object from a spatial distribution and time fluctuation of said motion vectors.

39. The apparatus according to claim 38, wherein said interruption means controls the image blur correcting operation on the basis of the motion vectors included in the area which has a moving object.

40. The apparatus according to claim 37, wherein said blur detection means detects random motions of objects, a uniformly repeated pattern, a low contrast state.

41. An image processing apparatus for detecting motion vectors from an image signal and correcting an image blur in real time, comprising;

vector detection means for detecting motion vectors between images by executing a correlation calculation between time-serially continuous images;

blur detection means for detecting a blur state of the image on the basis of a plurality of motion vectors detected by said vector detection means; and warning means for, when the blur amount of the image detected by said blur detection means has exceeded a predetermined value during a predetermined period of time, generating a warning.

42. The apparatus according to claim 41, wherein said blur detection means detects an area which has a moving object from a spatial distribution and time fluctuation of said motion vectors.

43. The apparatus according to claim 42, further comprises means for controlling the image blur correcting operation on the basis of the motion vectors included in the area which has a moving object.

44. The apparatus according to claim 41, wherein said blur detection means detects random motions of objects, a uniformly repeated pattern, a low contrast state.

* * * * *

UNITED STATES PATENT AND TRADEMARK OFFICE
CERTIFICATE OF CORRECTION

PATENT NO. : 5,712,474
DATED : Jan. 27, 1998
INVENTOR(S) : Kitahiro Kaneda

It is certified that error appears in the above-identified patent and that said Letters Patent is hereby corrected as shown below:

On title page, item [19] "Naneda" should read —Kaneda—
Item [75] change the name of the inventor to read —Kitahiro Kaneda—

Insert the following references in item [56] on the title page, after "U.S. Patent Documents".

2,829,557    4/1958    Jensen ......88/34
    2,959,088    11/1960    Rantsch .....88/1

Insert the following reference in item [56] on the title page, after "5,450,126 9/1995 Nishida .... 348/208":

FOREIGN PATENT DOCUMENTS 61-248681    11/1986    Japan

Signed and Sealed this

Sixteenth Day of June, 1998

*Attest:*

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO.   : 5,712,474
DATED        : January 27, 1998
INVENTOR(S)  : Kitahiro Kaneda It is certified that error appears in the above-identified patent and that said Letters Patent is hereby corrected as shown below:

Column 20, line 34, change "x-" to -- X- --.

Column 25, line 62, change "mount" to -- amount --.

Column 26, line 38, change "mount" to -- amount --.

Signed and Sealed this

Thirteenth Day of October 1998

Attest:

BRUCE LEHMAN

Attesting Officer

Commissioner of Patents and Trademarks